US012113303B2

(12) United States Patent
Kim et al.

(10) Patent No.: US 12,113,303 B2
(45) Date of Patent: Oct. 8, 2024

(54) ELECTRONIC DEVICE COMPRISING RADIO FREQUENCY CABLE

(71) Applicant: Samsung Electronics Co., Ltd., Suwon-si (KR)

(72) Inventors: Minseok Kim, Suwon-si (KR); Bumhee Bae, Suwon-si (KR); Jongwan Shim, Suwon-si (KR); Jeongnam Cheon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 18/073,081

(22) Filed: Dec. 1, 2022

(65) Prior Publication Data

US 2023/0130657 A1 Apr. 27, 2023

Related U.S. Application Data

(63) Continuation of application No. PCT/KR2022/013836, filed on Sep. 16, 2022.

(30) Foreign Application Priority Data

Oct. 27, 2021 (KR) ........................ 10-2021-0144930
Nov. 30, 2021 (KR) ........................ 10-2021-0168858

(51) Int. Cl.
*H01Q 9/04* (2006.01)
*H01Q 1/24* (2006.01)

(52) U.S. Cl.
CPC ........... *H01Q 9/0414* (2013.01); *H01Q 9/045* (2013.01); *H01Q 9/0478* (2013.01); *H01Q 1/243* (2013.01)

(58) Field of Classification Search
CPC ........ H01Q 9/04; H01Q 9/0414; H01Q 9/045; H01Q 9/0478; H01Q 1/243
See application file for complete search history.

(56) References Cited

U.S. PATENT DOCUMENTS 7,808,439 B2 10/2010 Yang et al.
8,279,611 B2 10/2012 Wong et al.
(Continued)

FOREIGN PATENT DOCUMENTS

EP 3 612 891 B1 4/2021
JP 2020-048040 A 3/2020
(Continued)

OTHER PUBLICATIONS

International Search Report dated Jan. 5, 2023, issued in International Patent Application No. PCT/KR2022/013836.

*Primary Examiner* — Hoang V Nguyen
(74) *Attorney, Agent, or Firm* — Jefferson IP Law, LLP

(57) ABSTRACT

An electronic device is provided. The electronic device includes a millimeter wave (mmWave) antenna including a plurality of conductive patches, a wireless communication circuit, and a radio frequency (RF) cable electrically connecting the mmWave antenna to the wireless communication circuit. A first portion of the RF cable includes a base dielectric, a metal plate disposed on one surface of the base dielectric, and a shielding film including a first region in contact with the metal plate, a second region spaced apart from the metal plate by a first height, and a third region configured to connect the first region and the second region, at least one waveguide is formed by the second region, the third region, and a portion of the metal plate, and the wireless communication circuit transmits and/or receives RF signals corresponding to the plurality of conductive patches through the at least one waveguide.

34 Claims, 13 Drawing Sheets

(56) References Cited

U.S. PATENT DOCUMENTS

| | | | | |
|---|---|---|---|---|
| 8,669,834 | B2 | 3/2014 | Cheng et al. | |
| 9,543,628 | B2 | 1/2017 | Lee et al. | |
| 10,971,792 | B2 | 4/2021 | Yoshioka et al. | |
| 10,992,015 | B2 | 4/2021 | Uemichi | |
| 2012/0093041 | A1 | 4/2012 | Takeda et al. | |
| 2012/0326813 | A1* | 12/2012 | Wong | H01P 3/121 216/13 |
| 2017/0229754 | A1 | 8/2017 | Lee et al. | |
| 2020/0295426 | A1 | 9/2020 | Jin | |

FOREIGN PATENT DOCUMENTS

| | | | |
|---|---|---|---|
| KR | 10-2006-0043490 | A | 5/2006 |
| KR | 10-2009-0008405 | A | 1/2009 |
| KR | 10-2013-0002728 | A | 1/2013 |
| KR | 10-2057314 | B1 | 1/2020 |
| KR | 10-2020-0024500 | A | 3/2020 |

* cited by examiner

ELECTRONIC DEVICE COMPRISING RADIO FREQUENCY CABLE

CROSS-REFERENCE TO RELATED APPLICATION(S)

This application is a continuation application, claiming priority under § 365(c), of an International application No. PCT/KR2022/013836, filed on Sep. 16, 2022, which is based on and claims the benefit of a Korean patent application number 10-2021-0144930, filed on Oct. 27, 2021, in the Korean Intellectual Property Office, and of a Korean patent application number 10-2021-0168858, filed on Nov. 30, 2021, in the Korean Intellectual Property Office, the disclosure of each of which is incorporated by reference herein in its entirety.

TECHNICAL FIELD

The disclosure relates to an electronic device including a radio frequency (RF) cable.

BACKGROUND ART

In line with development of communication devices, an electronic device (for example, laptop computer) may include an antenna module capable of fast and high-capacity transmission for the purpose of production and transmission of various contents, Internet connection with various things (for example, Internet of things (IoT)), or communication connection between various sensors for autonomous driving. For example, the electronic device may include an antenna module configured to radiate millimeter wave (mmWave) signals (hereinafter, referred to as mmWave antenna module).

A wireless communication circuit may be electrically connected to each antenna module in order to control each antenna module. For example, the wireless communication circuit may be electrically connected to each antenna module by an RF cable made of a waveguide.

The above information is presented as background information only to assist with an understanding of the disclosure. No determination has been made, and no assertion is made, as to whether any of the above might be applicable as prior art with regard to the disclosure.

DISCLOSURE

Technical Problem

In general, a waveguide included in an RF cable may be formed as a substrate-integrated waveguide including via structures in metal plates on both surfaces thereof. However, the waveguide including via structures are unable to completely shield the interior of the waveguide, and accumulated loss of radio signals may occur.

In addition, in the case of an electronic device including a foldable display, stress may occur in the via structure of a waveguide in the folding area when the electronic device is folded or unfolded, thereby damaging the waveguide. Such damage to the waveguide may cause a problem in that, since the waveguide is not completely shielded, radio signals may leak.

Aspects of the disclosure are to address at least the above-mentioned problems and/or disadvantages and to provide at least the advantages described below. Accordingly, an aspect of the disclosure is to provide a waveguide which can be sealed more completely than a waveguide having a via structure, and which can also be implemented in a foldable electronic device.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes an mmWave antenna including a plurality of conductive patches, a wireless communication circuit disposed inside the electronic device, and a radio frequency (RF) cable configured to electrically connect the mmWave antenna and the wireless communication circuit, wherein a first portion of the RF cable includes a base dielectric, a metal plate disposed on one surface of the base dielectric, and a shielding film including a first region in contact with the metal plate, a second region spaced apart from the metal plate by a first height, and a third region configured to connect the first region and the second region, at least one waveguide is formed by the second region, the third region, and a portion of the metal plate, and the wireless communication circuit is configured to transmit and/or receive RF signals corresponding to the plurality of conductive patches through the at least one waveguide.

In accordance with another aspect of the disclosure, an electronic device is provided. The electronic device includes a first housing, a second housing connected to be rotatable relative to the first housing, a hinge structure configured to connect the second housing to the first housing such that the second housing is rotatable about a folding axis with respect to the first housing, an mmWave antenna including a plurality of conductive patches, a wireless communication circuit disposed inside the electronic device, and a radio frequency (RF) cable configured to electrically connect the mmWave antenna and the wireless communication circuit, wherein a first portion of the RF cable formed in a region of the hinge structure corresponding to the folding axis includes a base dielectric, a metal plate disposed on one surface of the base dielectric, and a shielding film including a first region in contact with the metal plate, a second region spaced apart from the metal plate by a first height, and a third region configured to connect the first region and the second region, at least one waveguide is formed by the second region, the third region, and a portion of the metal plate, and the wireless communication circuit transmits and/or receives RF signals corresponding to the plurality of conductive patches through the RF cable in which the at least one waveguide is formed.

In accordance with another aspect of the disclosure, an electronic device is provided. The electronic device includes an mmWave antenna including a plurality of conductive patches, a wireless communication circuit disposed inside the electronic device, and a radio frequency (RF) cable configured to electrically connect the mmWave antenna and the wireless communication circuit, wherein a first portion of the RF cable includes a metal plate disposed inside the RF cable, and a shielding film including a first region in contact with the metal plate, a second region spaced apart from the metal plate by a first height, and a third region configured to connect the first region and the second region, at least one waveguide is formed by the second region, the third region, and a portion of the metal plate, and the wireless communication circuit transmits and/or receives RF signals corresponding to the plurality of conductive patches through the at least one waveguide.

Advantageous Effects

In accordance with another aspect of the disclosure, an electronic device is provided. The electronic device includes an RF cable capable of increasing the electromagnetic wave shielding ratio and decreasing path loss compared with an RF cable adopting a conventional waveguide formed in a via structure.

In addition, according to various embodiments, the possibility that a waveguide will be damaged when a foldable electronic device is folded or unfolded, and the electronic device may thus have improved durability compared with a case in which an RF cable adopting a conventional waveguide is used.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
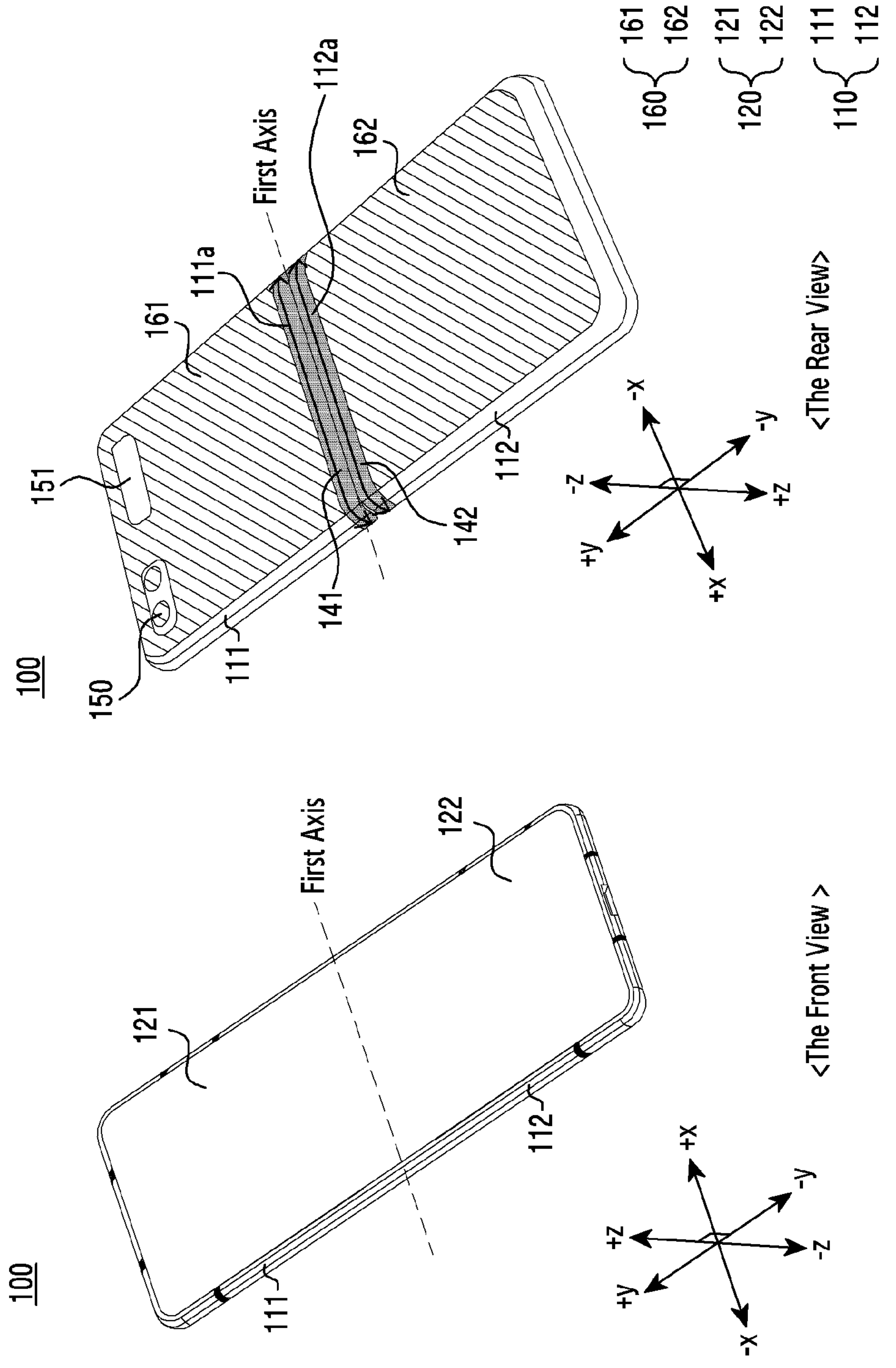
FIG. 1 illustrates a first state (e.g., an unfolded state) of an electronic device according to an embodiment of the disclosure.

FIG. 1 illustrates a first state (e.g., an unfolded state) of an electronic device according to an embodiment of the disclosure.

Figure 2:
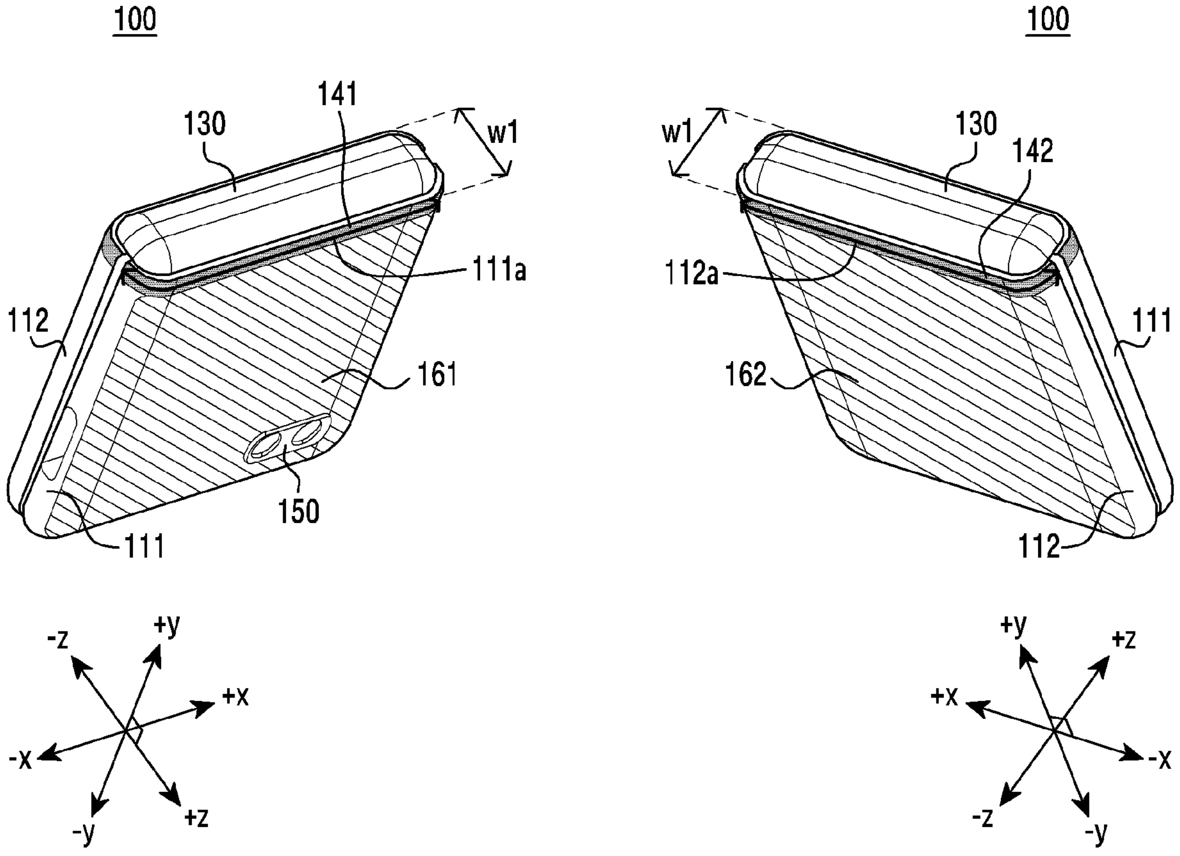
FIG. 2 illustrates a second state (e.g., a folded state) of an electronic device according to an embodiment of the disclosure.

FIG. 2 illustrates a second state (e.g., a folded state) of an electronic device according to an embodiment of the disclosure.

FIG. 1 illustrates front and rear surfaces of an electronic device in an unfolded state according to an embodiment of the disclosure.

Referring to FIG. 1, an electronic device 100 according to an embodiment may include a housing 110, a flexible display 120 disposed on the housing 110, and/or a rear cover 160. In the disclosure, the surface on which the flexible display 120 is disposed is defined as a front surface of the electronic device 100. In addition, the opposite surface of the front surface is defined as the rear surface of the electronic device 100. In addition, a surface surrounding the space between the front surface and the rear surface is defined as a side surface of the electronic device 100.

In an embodiment, the housing 110 may include a first housing 111 and a second housing 112. In one example, the first housing 111 and the second housing 112 may form a portion of the rear surface and at least a portion of the side surface of the electronic device 100. In an embodiment, the first housing 111 and/or the second housing 112 may include a conductive material (e.g., metal).

According to an embodiment, the rear cover 160 may be coupled to the housing 110 to form a rear surface of the electronic device 100. For example, a first rear cover 161 may be coupled to the first housing 111, and a second rear cover 162 may be coupled to the second housing 112. In one example, the first housing 111 and the first rear cover 161, and the second housing 112 and the second rear cover 162 may form at least a portion of the rear surface of the electronic device 100. In one embodiment, it has been described that the housing 110 of the electronic device 100 is separated from the rear cover 160, but in another embodiment, the housing 110 may be integrally formed with the rear cover 160.

In an embodiment, the rear cover 160 may include an insulating material (e.g., a plastic resin). In another embodiment, the rear cover 160 may include a conductive material (e.g., aluminum).

According to an embodiment, the first housing 111 and the second housing 112 may be disposed opposite to each other about a folding axis (e.g., a first axis) parallel to the x-axis, and the first housing 111 and the second housing 112 may have a symmetrical shape overall with respect to the folding axis (e.g., the first axis). However, the same are not limited to a symmetrical shape, and the first housing 111 and the second housing 112 may have an asymmetrical shape with respect to the folding axis (e.g., the first axis).

According to an embodiment, the electronic device 100 may have an unfolded state, a folded state, and/or an intermediate state. In an embodiment, the state of the electronic device 100 may vary according to an angle or distance between the first housing 111 and the second housing 112. For example, a state in which the first housing 111 and the second housing 112 are arranged at an angle of 180 degrees may be an unfolded state.

As another example, a state in which the first housing 111 and the second housing 112 are disposed to face each other may be a folded state. As another example, a state in which the first housing 111 and the second housing 112 are arranged to form a certain angle with each other may be an intermediate state. However, the specific angles formed by the first housing 111 and the second housing 112 in the folded state and the unfolded state are for convenience of description and are not limited thereto.

In an embodiment, the first housing 111 may include a first edge 111*a* adjacent to the folding axis (e.g., the first axis) and substantially parallel to the folding axis, and the second housing 112 may include a second edge 112*a* adjacent to the folding axis (e.g., the first axis) and substantially parallel to the folding axis. In an embodiment, when the electronic device 100 is in an unfolded state, the first edge 111*a* of the first housing 111 may be in contact with the second edge 112*a* of the second housing 112 or may be spaced apart from each other by a predetermined distance.

According to an embodiment, the first housing 111 may include a first conductive portion 141. In an embodiment, the first conductive portion 141 may be formed to correspond to the first edge 111*a* of the first housing 111. For example, the first conductive portion 141 may be formed along the first edge 111*a* of the first housing 111.

According to an embodiment, the second housing 112 may include a second conductive portion 142. In an embodiment, the second conductive portion 142 may be formed to correspond to the second edge 112*a* of the second housing 112. For example, the second conductive portion 142 may be formed along the second edge 112*a* of the second housing 112.

In an embodiment, when the electronic device 100 is in an unfolded state, the first conductive portion 141 and the second conductive portion 142 may be in contact with each other or may be spaced apart from each other by a predetermined distance.

However, the first conductive portion 141 and the second conductive portion 142 shown in FIG. 1 are for convenience of description, and the first conductive portion 141 and the second conductive portion 142 may have various sizes and shapes.

In an embodiment, at least a portion of the first housing 111 and the second housing 112 may be formed of a metal material (e.g., aluminum) or a non-metal material having a rigidity of a size selected to support the flexible display 120.

In an embodiment, the housing 110, the rear cover 160, and the flexible display 120 may form an internal space in which various components (e.g., a printed circuit board, or a battery) of the electronic device 100 may be disposed.

According to an embodiment, the flexible display 120 may be disposed in the housing 110. For example, the flexible display 120 may be seated in a recess formed by the housing 110 and may form most of the front surface of the electronic device 100.

In an embodiment, the flexible display 120 may include a first region 121 and a second region 122. The first region 121 and the second region 122 of the flexible display 120 may be divided based on a first axis about the electronic device 100 is folded or unfolded.

The region division of the flexible display 120 shown in FIG. 1 is provided as an example, and in an embodiment, the flexible display 120 may be divided into two or more regions according to a structure or function thereof. For example, the flexible display 120 may be divided into a folding region having a predetermined curvature when the electronic device 100 is folded around a folding axis (e.g., the first axis), and a first region adjacent to the first housing 111 and a second region adjacent to the second housing 112, based on the folding region. According to an embodiment, the first region 121 and the second region 122 may have a symmetrical shape overall with respect to the folding axis (e.g., the first axis).

According to an embodiment, the arrangement structure of the first region 121 and the second region 122 of the flexible display 120 may vary according to the state of the electronic device 100. For example, when the electronic device 100 is in an unfolded state, the first region 121 and the second region 122 of the flexible display 120 may form an angle of 180 degrees with each other and may face in the same direction (e.g., the −y direction).

As another example, when the electronic device 100 is in a folded state, the first region 121 and the second region 122 of the flexible display 120 may form an acute angle (e.g., between 0 to 10 degrees) with respect to each other and may face each other.

As another example, when the electronic device 100 is in an intermediate state, the first region 121 and the second region 122 of the flexible display 120 may form an angle greater than the folded state and smaller than the unfolded state. In this case, at least a portion of the flexible display 120 may have a curved surface having a certain curvature, and the curvature may be smaller than that in the folded state.

However, the specific angles formed by the first region 121 and the second region 122 in the above-described folded state and unfolded state are for convenience of explanation, and are not limited thereto.

According to an embodiment, the electronic device 100 may include a camera hole 150 and/or a sub-display 151. In an embodiment, the camera hole 150 may correspond to a hole through which at least one lens of the camera module 180 is exposed. Light from the outside of the electronic device 100 may be incident to the camera module 180 disposed inside the electronic device 100 through the camera hole 150. In an embodiment, when the electronic device 100 is in a folded state, the sub-display 151 may display a designated object (e.g., the current time, the battery residual quantity of the electronic device 100).

According to an embodiment, the shapes of the camera hole 150 and the sub-display 151 are not limited to those shown in FIG. 1. For example, the camera hole 150 may be disposed parallel to the first axis (e.g., the y-axis).

In addition, the sub-display 151 may occupy most of the region of the first rear cover 161. For example, the sub-display 151 may be formed to extend to a region adjacent to the camera hole 150 from the first side surface of the first housing 111 spaced apart from the camera hole 150.

FIG. 2 is a perspective view illustrating an electronic device in a folded state according to an embodiment of the disclosure.

Referring to FIG. 2, an electronic device 100 according to an embodiment may include a hinge cover 130. The hinge cover 130 may be disposed between the first housing 111 and the second housing 112 to cover an internal component (e.g., a hinge structure).

In an embodiment, at least a portion of the hinge cover 130 may be covered by a portion of the first housing 111 and the second housing 112 or exposed to the outside depending on the state of the electronic device 100. For example, when the electronic device 100 is in an unfolded state, the hinge cover 130 may be covered by the first housing 111 and the second housing 112 so as not be exposed to the outside. As another example, when the electronic device 100 is in a folded state, the hinge cover 130 between the first housing 111 and the second housing 112 may be exposed to the outside by a first width (w1). For another example, when the first housing 111 and the second housing 112 are in an intermediate state which is folded with a certain angle, the hinge cover 130 between the first housing 111 and the second housing 112 may be partially exposed to the outside may be partially exposed to the outside. However, the width length of the portion of the hinge cover 130 exposed to the outside in the intermediate state may be smaller than the width length (e.g., the first width (w1)) exposed to the outside in the folded state. In an embodiment, the hinge cover 130 may include a curved surface. In an embodiment, the hinge cover 130 may include a conductive material (e.g., aluminum).

In an embodiment, the internal structure between the hinge cover 130 and the first conductive portion 141 is not shown in the drawing. However, in practice, the first conductive portion 141 may be spaced apart from the hinge cover 130 by a predetermined distance. As another example, the second conductive portion 142 may be spaced apart from the hinge cover 130 by a predetermined distance. However, the hinge cover 130 and each of the first conductive portion 141 and the second conductive portion 142 may be spaced apart from each other within a distance range in which the same may be electromagnetically connected through a coupling.

Figure 3:
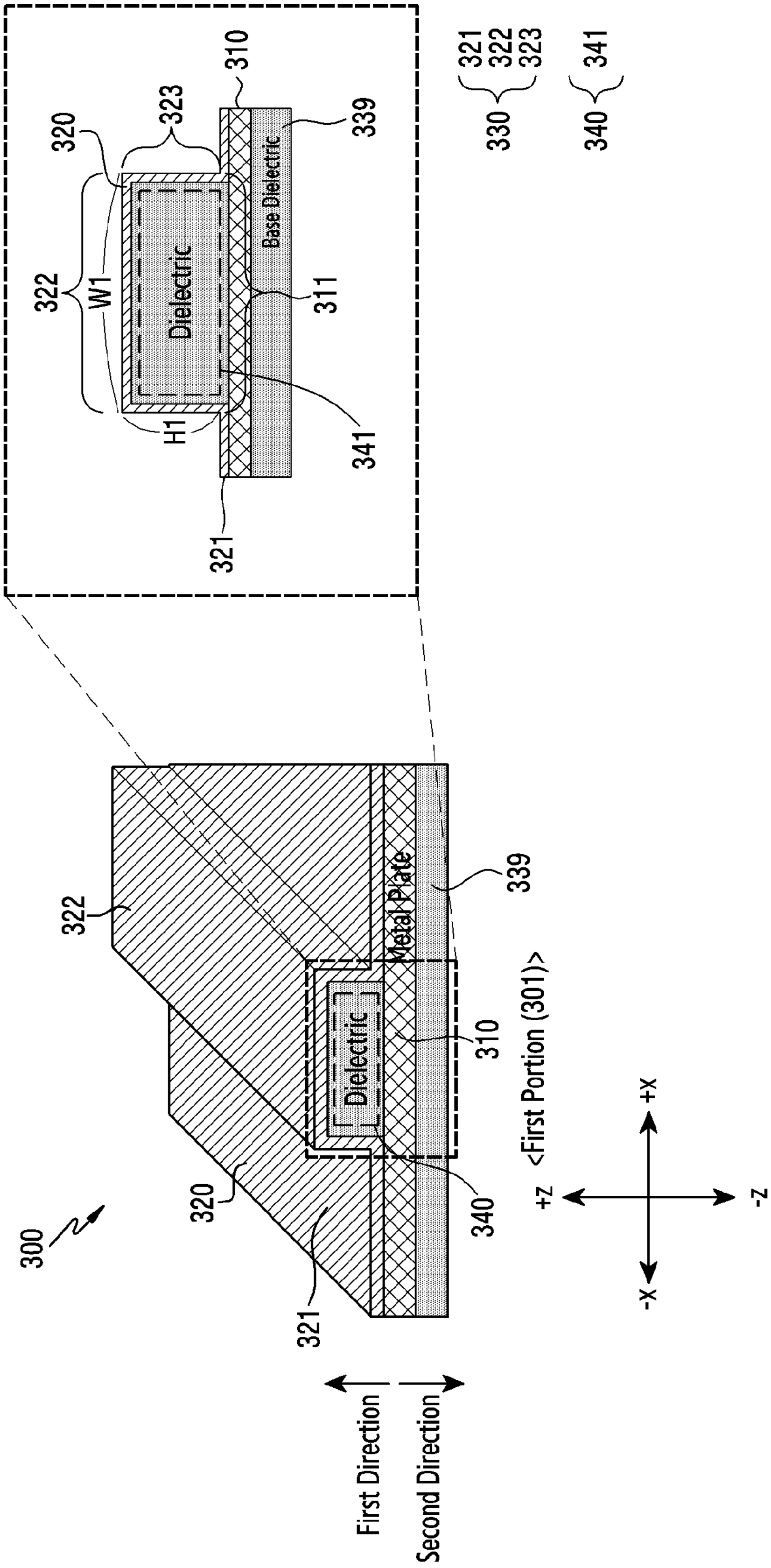
FIG. 3 illustrates an RF cable of an electronic device according to an embodiment of the disclosure.

FIG. 3 illustrates an RF cable of an electronic device according to an embodiment of the disclosure.

According to an embodiment, the electronic device 100 may include an antenna (not shown), a wireless communication circuit (not shown), and a radio frequency (RF) cable 300.

According to an embodiment, the antenna (not shown) may include an mmWave antenna (not shown). For example, the mmWave antenna may include a plurality of conductive patches, but is not limited thereto.

As another example, the mmWave antenna may include a plurality of antenna arrays (e.g., a dipole antenna array, and/or an additional patch antenna array) of the same or different shape or type in addition to the plurality of conductive patches.

In an embodiment, the plurality of conductive patches may act as antenna elements configured to form a directional beam.

According to an embodiment, the wireless communication circuit may be disposed inside the electronic device 100. For example, a printed circuit board (PCB), (not shown) may be disposed inside the electronic device 100, and the wireless communication circuit may be disposed on the PCB.

An embodiment related to the mmWave antenna and the wireless communication circuit disposed in the electronic device 100 will be described later in detail with reference to FIGS. 10 to 12.

According to an embodiment, the RF cable 300 may electrically connect the mmWave antenna and the wireless communication circuit to each other. In one example, the RF cable 300 may include a first connection portion (e.g., first connection portion 801 in FIG. 8), a second connection portion (e.g., second connection portion 802 in FIG. 8), and a first portion 301. For example, the first connection portion 801 of the RF cable 300 may be electrically connected to a wireless communication circuit, and the second connection portion 802 of the RF cable 300 may be electrically connected to the mmWave antenna.

An embodiment related to the first connection portion 801 and the second connection portion 802 will be described later in detail with reference to FIG. 8, and an embodiment related to the first portion 301 will be described in detail in FIG. 3.

According to an embodiment, the first portion 301 of the RF cable 300 may correspond to a region occupying most of the RF cable 300. For example, the first portion 301 of the RF cable 300 may be formed in the remaining region other than the first connection portion 801 partially formed at one end of the RF cable 300 and the second connection portion 802 partially formed at the other end of the RF cable 300.

According to an embodiment, the first portion 301 of the RF cable 300 may include a metal plate 310 disposed inside the RF cable 300, and a shielding film 320 disposed on the metal plate 310. According to an embodiment, the first portion 301 of the RF cable 300 may further include a base dielectric material 339 in contact with the metal plate 310.

According to an embodiment, the base dielectric material 339 may be disposed inside the first portion 301 of the RF cable 300. In one example, the base dielectric material 339 may be disposed to support the metal plate 310 of the RF cable 300 to be described later or a waveguide 340 formed on the metal plate 310.

According to an embodiment, the metal plate 310 may be disposed on the base dielectric material 339. In one example, the metal plate 310 may be disposed on one surface of the base dielectric material 339 facing in the first direction (e.g., the +z direction). According to an embodiment, one surface of the metal plate 310 may be in contact with the base dielectric material 339, and the other surface of the metal plate 310 may be in contact with a portion of the shielding film 320. In other words, according to an embodiment, the metal plate 310 may be disposed between the base dielectric material 339 and the shielding film 320.

However, one surface of the base dielectric material 339 on which the metal plate 310 is disposed is not limited to one surface facing in the first direction (e.g., the +z direction). For example, the metal plate 310 may be disposed on the other surface of the base dielectric material 339 facing in the second direction (e.g., the −z direction) opposite to the first direction.

According to an embodiment, the shielding film 320 may be disposed on one surface of the metal plate 310. For example, the shielding film 320 may be disposed on one surface of the metal plate 310 facing in the first direction (e.g., the +z direction), but is not limited thereto. For example, the shielding film 320 may be disposed on the other surface of the metal plate 310 facing in the second direction and disposed on the other surface of the base dielectric material 339 facing in the second direction (e.g., the −z direction).

An embodiment in which the metal plate 310 and the shielding film 320 are disposed on the other surface of the base dielectric material 339 facing in the second direction (e.g., the −z direction) will be described later in detail with reference to FIG. 5.

According to an embodiment, the shielding film 320 may be in direct contact with a portion of the metal plate 310. In one example, a portion of the shielding film 320 may be in contact with the metal plate 310, and the other portion of the shielding film 320 may protrude from the metal plate 310. For example, the shielding film 320 may include a first region 321 in contact with the metal plate 310, a second region 322 spaced apart from the metal plate 310 in the first direction (e.g., the +z direction), and a third region 323 connecting the first region 321 and the second region 322. According to an embodiment, the second region 322 and the third region 323 of the shielding film 320 may protrude from the metal plate 310 in the first direction (e.g., the +z direction).

According to an embodiment, the second region 322 may be formed to be spaced apart from the first region 321 or the metal plate 310. For example, the second region 322 may extend in a third direction (e.g., the +x direction or the −x direction) from a region spaced apart in the first direction (e.g., the +z direction) from the first region 321 or the metal plate 310 by a first height (H1).

According to an embodiment, the second region 322 may have a first width (W1). In one example, the first width (W1) formed by the second region 322 may be within 0.2 μm to 0.4 μm, but is not limited thereto. For example, the first width (W1) may be less than 0.2 μm. As another example, the first width (W1) may exceed 0.4 μm.

According to an embodiment, the third region 323 may connect the first region 321 and the second region 322. In one example, the third region 323 may extend from the first region 321 to the second region 322 and connect the first region 321 and the second region 322. For example, the third region 323 may extend from one end of the first region 321 to the second region 322 in the first direction (e.g., the +z direction) to connect the first region 321 and the second region 322.

According to an embodiment, the third region 323 may extend to the second region 322 by the first height (H1). According to an embodiment, the first height (H1) formed by the third region 323 may be within a range of 190 μm to 200 μm, but is not limited thereto. For example, the first height (H1) may be less than 190 μm. As another example, the first height (H1) may exceed 200 μm.

According to an embodiment, the shielding film 320 may include a conductive material for shielding electromagnetic waves. For example, the shielding film 320 may include copper, but is not limited thereto. As another example, the shielding film 320 may include aluminum. In an embodiment, the shielding film 320 may include a conductive material, and a protective material surrounding the conductive material. However, in another embodiment, the shielding film 320 itself may be a conductive material.

According to an embodiment, the shielding film 320 may be formed of a flexible material. According to an embodiment, due to the flexible material constituting the shielding film 320, the RF cable 300 may be disposed in a folding region of the electronic device 100 which is folded or unfolded.

According to an embodiment, in case that the RF cable 300 including the shielding film 320 formed of a flexible material is disposed in the folding region of the electronic device 100, the foldable electronic device 100 may secure higher durability in the folding region than the case in which a conventional via structure is used. In the disclosure, the shielding film 320 formed of a flexible material may include a case in which the shielding film 320 has flexibility because the material (e.g., copper) of the shielding film 320 has a very thin thickness.

According to an embodiment, at least one waveguide 340 may be formed in the first portion 301 of the RF cable 300. For example, the at least one waveguide 340 may be formed by the shielding film 320 and the metal plate 310.

Referring to FIG. 3 according to an embodiment, at least one waveguide 340 may include a first waveguide 341.

According to an embodiment, the first waveguide 341 may be formed by the shielding film 320 and the metal plate 310. In one example, the first waveguide 341 may be formed by the second region 322 of the shielding film 320, the third region 323 of the shielding film 320, and a portion of the metal plate 310. For example, the first waveguide 341 may be formed by the second region 322, the third region 323, and a first portion 311 of the metal plate 310 which is not in contact with the shielding film 320. In other words, according to an embodiment, the second region 322, the third region 323, and the first portion 311 of the metal plate 310 may correspond to respective edges of the first waveguide 341.

According to an embodiment, a cross-section (e.g., an xz plane) of the first waveguide 341 may be formed in a rectangular shape, but is not limited thereto. For example, a cross-section of the first waveguide 341 may be formed in a trapezoid shape. As another example, the first waveguide 341 may be formed in a square or circular shape.

According to an embodiment, the first waveguide 341 may extend along the first axis (e.g., the y-axis). According to an embodiment, the first waveguide 341 may extend along the first axis (e.g., the y-axis), and accordingly, the first waveguide 341 may form a conduit.

According to an embodiment, the first waveguide 341 may be formed by the second region 322, the third region 323, and the first portion 311 of the metal plate 310, and accordingly, the internal space of the first waveguide 341 may be more completely shielded than a waveguide including a via structure. According to an embodiment, the cumulative loss of the RF signal passing through the waveguide 340 may be reduced due to the complete shielding of the waveguide 340 by the shielding film 320 and the metal plate 310.

In addition, according to an embodiment, in case that the first waveguide 341 is formed of the shielding film 320, the foldable electronic device 100 may secure higher durability in the folding region than the case in which a conventional via structure is used.

According to an embodiment, the first portion 301 of the RF cable 300 may further include at least one dielectric 330. In one example, the at least one dielectric 330 may be included in a space formed by the first portion 301 of the metal plate 310 and the second region 322 and the third region 323 of the shielding film 320. In other words, according to an embodiment, the at least one dielectric 330 may be included in the first waveguide 341.

According to an embodiment, the at least one dielectric 330 included in the first waveguide 341 may include a first dielectric having a first dielectric constant and a second dielectric having a second dielectric constant different from the first dielectric constant. However, the disclosure is not limited thereto. For example, the at least one dielectric 330 may include only a first dielectric having a first dielectric constant. For another example, the at least one dielectric 330 may include a first dielectric having a first dielectric constant, a second dielectric having a second dielectric constant, and a third dielectric (e.g., polyethylene) having a third dielectric constant. According to another embodiment, the at least one dielectric 330 may further include air or may include only air. In other words, the interior of the first waveguide 341 may be empty.

According to an embodiment, the base dielectric material 339 may include a dielectric substantially the same as the at least one dielectric 330, but is not limited thereto. For example, the base dielectric material 339 may include a dielectric that is substantially different from the at least one dielectric 330. As another example, a portion of the base dielectric material 339 may include a dielectric substantially identical to the at least one dielectric 330, and the other portion of the base dielectric material 339 may include a dielectric substantially different from the at least one dielectric 330.

According to an embodiment, the waveguide 340 has been described with only the first waveguide 341 as an example, but is not limited thereto. For example, the at least one waveguide 340 may further include a second waveguide. As another example, the at least one waveguide 340 may further include a plurality of waveguides.

A plurality of waveguides formed in the first portion 301 of the RF cable 300 will be described later with reference to FIGS. 4 to 5.

According to an embodiment, the electronic device 100 may transmit and/or receive an RF signal through the RF cable 300. For example, the wireless communication circuit of the electronic device 100 may be electrically connected to an antenna including a plurality of conductive patches through the RF cable 300.

According to an embodiment, the wireless communication circuit may transmit and/or receive RF signals corresponding to the plurality of conductive patches through at least one RF cable 300. For example, according to an embodiment, the wireless communication circuit may transmit or receive an RF signal to or from an antenna including a plurality of conductive patches through at least one waveguide 340 formed in the first portion 301 of the RF cable 300.

According to one embodiment, the RF cable 300 formed of at least one waveguide 340 formed of the shielding film 320 and the metal plate 310 may perform more perfect shielding than the RF cable 300 including a waveguide formed of a via structure, thereby blocking the leakage of RF signal. In other words, according to an embodiment, in case that the waveguide 340 is formed by the shielding film 320 and the metal plate 310, the cumulative loss of the RF signal passing through the waveguide 340 may be reduced.

In addition, according to an embodiment, in case that the waveguide 340 is formed of the shielding film 320 formed of a material having high ductility, the foldable electronic device 100 may secure higher durability in the folding region than the case in which a conventional via structure is used.

Figure 4:
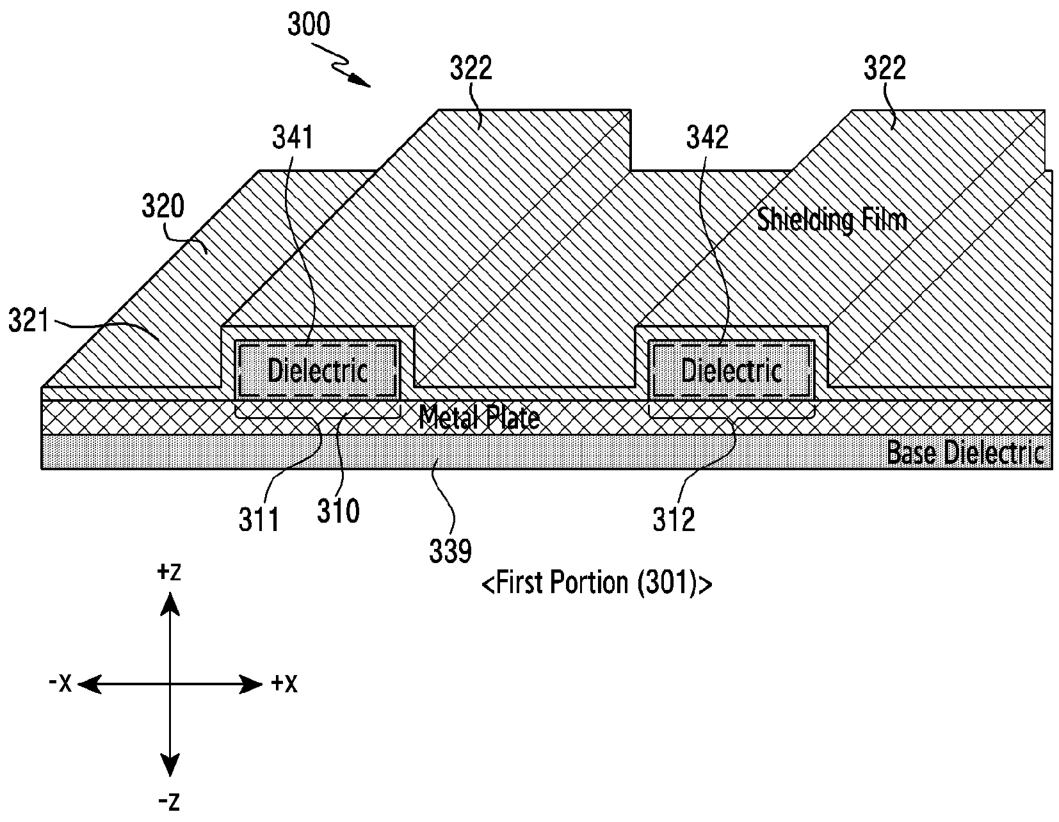
FIG. 4 illustrates an RF cable of an electronic device according to an embodiment of the disclosure.

FIG. 4 illustrates an RF cable of an electronic device according to another embodiment of the disclosure.

Referring to FIG. 4, unlike an RF cable 300 including a first waveguide 341 in FIG. 3, an RF cable 300 in FIG. 4 may further include a second waveguide 342.

According to an embodiment, the first portion 301 of the RF cable 300 may include at least one waveguide 340. According to an embodiment, the at least one waveguide 340 may include the first waveguide 341 and the second waveguide 342 distinguished from the first waveguide 341.

According to an embodiment, the second waveguide 342 may correspond to substantially the same waveguide as the first waveguide 341 in FIG. 3. For example, the second waveguide 342 may be surrounded by the second region 322 and the third region 323 of the shielding film 320, and a second portion 312 of the metal plate 310. In addition, for example, the second waveguide 342 may include air or at least one dielectric 330 including a first dielectric having a first dielectric constant and a second dielectric having a second dielectric constant.

According to an embodiment, the second waveguide 342 may correspond to a conduit for transmitting and/or receiving an RF signal, which is distinguished from the first waveguide 341, but is not limited thereto. For example, the second waveguide 342 may correspond to a conduit for transmitting and/or receiving a signal, which is substantially the same as the first waveguide 341.

According to an embodiment, the at least one waveguide 340 may be electrically connected to an mmWave antenna including a plurality of conductive patches (not shown). For example, the first waveguide 341 may be electrically connected to a first conductive patch of the mmWave antenna, and the second waveguide 342 may be electrically connected to a second conductive patch (not shown) of the mmWave antenna.

At least one waveguide 340 formed in the first portion 301 of the RF cable 300 has been described as including the first waveguide 341 and the second waveguide 342, but is not limited thereto. For example, the at least one waveguide 340 formed in the first portion 301 of the RF cable 300 may further include a third waveguide. According to an embodiment, the third waveguide may also be formed by the second region 322, the third region 323, and a portion of the metal plate 310, and may include a dielectric having a first dielectric constant.

Figure 5:
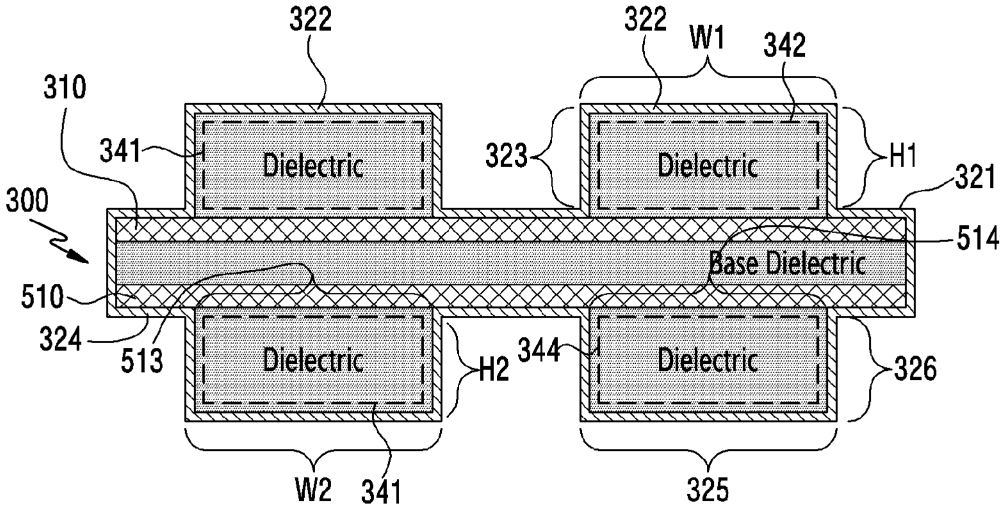
FIG. 5 illustrates an RF cable of an electronic device according to an embodiment of the disclosure.

FIG. 5 illustrates an RF cable of an electronic device according to an embodiment of the disclosure.

Referring to FIG. 5, unlike an RF cable 300 including a first waveguide 341 and a second waveguide 342 in FIG. 4, an RF cable 300 in FIG. 5 may further include a third waveguide 343 and a fourth waveguide 344.

According to an embodiment, the RF cable 300 may include a first metal plate 310 and a second metal plate 510. According to an embodiment, the first metal plate 310 may be the metal plate 310 in FIGS. 3 and 4.

According to an embodiment, the second metal plate 510 may be distinguished from the first metal plate 310. In one example, the second metal plate 510 may be disposed in a region different from that of the first metal plate 310 in the first portion 301 of the RF cable 300. For example, the first metal plate 310 may be disposed on one surface of the base dielectric material 339 disposed in the first portion 301 of the RF cable 300, and the second metal plate 510 may be disposed on the other surface opposite to one surface of the base dielectric material 339. For example, the first metal plate 310 may be disposed on the one surface of the base dielectric material 339 facing in the first direction (e.g., the +z direction), and the second metal plate 510 may be disposed on the other surface of the base dielectric material 339 facing in the second direction (e.g., the −z direction) opposite to the first direction.

In other words, according to an embodiment, the base dielectric material 339 may be disposed between the first metal plate 310 and the second metal plate 510. In one example, the first metal plate 310 and the second metal plate 510 may be disposed in parallel with the base dielectric material 339 interposed therebetween.

According to an embodiment, the shielding film 320 in FIG. 5 may be formed of at least one shielding film. For example, the shielding film 320 in contact with the first metal plate 310 may extend to the second metal plate 510 to form a single shielding film. As another example, the shielding film 320 may be separated into a first shielding film in contact with the first metal plate 310 and a second shielding film in contact with the second metal plate 510. According to an embodiment, even in case that the first shielding film and the second shielding film are separated from each other, the material of the shielding film may be substantially the same.

According to an embodiment, the shielding film 320 may be in direct contact with a portion of the second metal plate 510. In one example, a portion of the shielding film 320 may be in contact with the second metal plate 510, and the other portion of the shielding film 320 may protrude from the metal plate 310. For example, the shielding film 320 may further include a fourth region 324 in contact with the second metal plate 510, a fifth region 325 spaced apart from the second metal plate 510 in the second direction (e.g., the −z direction), and a sixth region 326 connecting the fourth region 324 and the fifth region 325. According to an embodiment, the fifth region 325 and the sixth region 326 of the shielding film 320 may protrude from the second metal plate 510 in the second direction (e.g., the −z direction).

According to an embodiment, the fifth region 325 may be formed to be spaced apart from the fourth region 324 or the second metal plate 510. For example, the fifth region 325 may extend in a third direction (e.g., the +x direction or the −x direction) from a region spaced apart from the fourth region 324 or the second metal plate 510 by a second height (H2) in the second direction (e.g., the −z direction).

According to an embodiment, the sixth region 326 may extend from the fourth region 324 to the fifth region 325. For example, the sixth region 326 may extend from one end of the fourth region 324 by the second height (H2) in the second direction (e.g., the −z direction).

According to an embodiment, the second height (H2) of the sixth region 326 may correspond to substantially the same height as the first height (H1) of the third region 323 of the shielding film 320 in FIG. 3, but is not limited thereto. For example, the second height (H2) may be higher than the first height (H1). As another example, the second height (H2) may be lower than the first height (H1).

According to an embodiment, the fifth region 325 may have a second width (W2). In one example, the second width (W2) formed by the fifth region 325 may be substantially the same as the first width (W1) of the second region 322, but is not limited thereto. For example, the second width (W2) may be greater than the first width (W1). As another example, the second width (W2) may be smaller than the first width (W1).

According to an embodiment, the first portion 301 of the RF cable 300 may further include at least one waveguide 340. For example, the first portion 301 of the RF cable 300 may further include a third waveguide 343 and a fourth waveguide 344, but is not limited thereto, and, for example, may further include a fifth waveguide.

According to an embodiment, the third waveguide 343 and the fourth waveguide 344 may be formed by the fourth region 324, the fifth region 325 of the shielding film 320, and a portion of the second metal plate 510. For example, the third waveguide 343 may be formed by the fifth region 325, the sixth region 326, and a third portion 513 of the second metal plate 510 which is not in contact with the shielding film 320. In other words, according to an embodiment, the fifth region 325, the sixth region 326, and the third portion 513 of the metal plate 310 may correspond to respective edges of the third waveguide 343.

Although the third waveguide 343 has been described as an example, the fourth waveguide 344 may also be formed to be substantially the same as the third waveguide 343. For example, the fourth waveguide 344 may be formed by the fifth region 325, the sixth region 326, and a fourth portion 514 of the second metal plate 510 which is not in contact with the shielding film 320.

According to an embodiment, the third waveguide 343 and the fourth waveguide 344 may correspond to substantially the same waveguide 340 as the first waveguide 341 in FIG. 3. For example, the third waveguide 343 and the fourth waveguide 344 may be formed by the flexible shielding film 320 and may include at least one dielectric 330.

According to an embodiment, in cast that the third waveguide 343 and the fourth waveguide 344 are formed by the fifth region 325, the sixth region 326, the third portion 513 of the second metal plate 510 and/or the fourth portion 514 of the second metal plate 510, the space inside the third waveguide 343 and the fourth waveguide 344 may be more completely shielded than the case in which the waveguide including a via structure. In other words, according to an embodiment, in case that the waveguide 340 is formed by the shielding film 320 and the second metal plate 510, cumulative loss of an RF signal passing through the waveguide 340 may be reduced.

According to an embodiment, in case that the third waveguide 343 and the fourth waveguide 344 are completely shielded, loss of an RF signal transmitted through the RF cable 300 may be reduced.

In addition, in case that the RF cable 300 including the waveguide 340 formed of a material having high ductility is disposed in the folding region, the foldable electronic device 100 may secure higher durability in the folding region than the case in which a conventional via structure is used.

Figure 6:
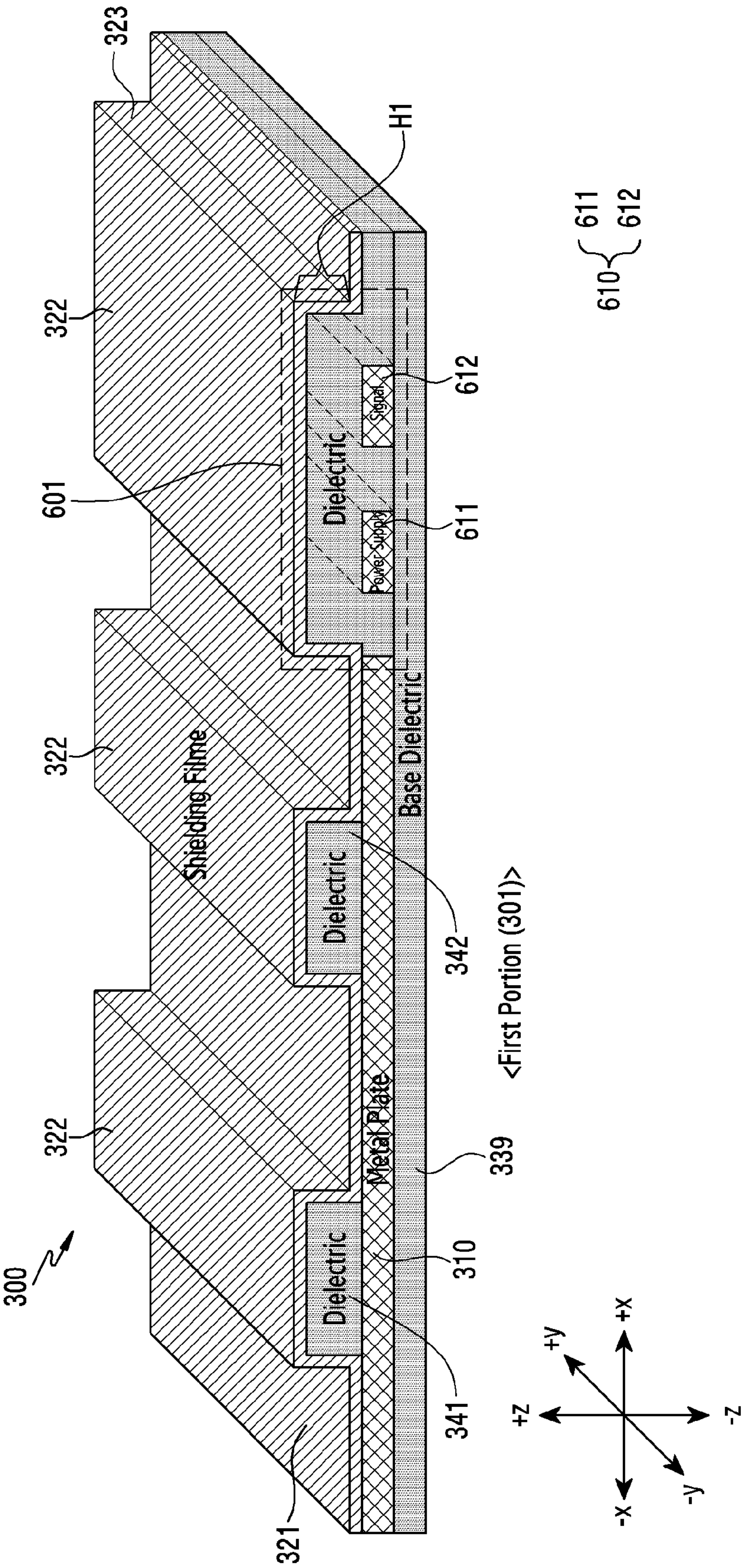
FIG. 6 illustrates an RF cable of an electronic device according to an embodiment of the disclosure.

FIG. 6 illustrates an RF cable of an electronic device according to an embodiment of the disclosure.

Referring to FIG. 6, a first portion 301 of an RF cable 300 in FIGS. 3 to 5 may further include at least one power transmission line 610.

According to an embodiment, the at least one power transmission line 610 may include a power supply line 611 and a signal line 612.

According to an embodiment, the power transmission line 610 may be electrically connected to a plurality of electronic components inside the electronic device 100. For example, the power line 611 may be electrically connected to a battery (not shown), and the signal line 612 may be electrically connected to a PCB (not shown).

The at least one power transmission line 610 has been described with two which are the power supply lines 611 and the signal line 612, but is not limited thereto. For example, the at least one power transmission line 610 may further include a second signal line separated from the signal line 612.

According to an embodiment, at least one power transmission line 610 may be disposed in a power transmission region 601. For example, the power line 611 and the signal line 612 may be disposed within the power transmission region 601.

In one example, the power transmission region 601 may be formed in the first portion 301 of the RF cable 300. For example, the power transmission region 601 may be formed in a region of the first portion 301 adjacent to the second waveguide 342, but is not limited thereto. As another example, the power transmission region 601 may be formed in a region adjacent to the first waveguide 341.

According to an embodiment, the power transmission region 601 may be formed by the shielding film 320 and the base dielectric material 339. In one example, the power transmission region 601 may be surrounded by the base dielectric material 339 and the shielding film 320. For example, the shielding film 320 may include the second region 322 spaced apart from the power line 611 and/or the signal line 612, and the third region 323 connecting the first region 321 and the second region 322. According to an embodiment, the power transmission region 601 may be surrounded by a portion of the base dielectric material 339 and the second region 322 of the shielding film 320, and/or the third region 323 of the shielding film 320, but is not limited thereto. As another example, the power transmission region 601 may be further surrounded by a portion of the metal plate 310.

According to an embodiment, the power line 611 and/or the signal line 612 may be disposed on the base dielectric material 339 in the power transmission region 601. For example, the power line 611 and/or the signal line 612 may be disposed on the same layer as the metal plate 310 disposed on the base dielectric material 339. In an embodiment, the signal transmitted through the signal line 612 may be a signal (e.g., a control signal, etc.) different from the RF signal transmitted through the waveguide.

According to an embodiment, the third region 323 constituting the boundary of the power transmission region 601 may extend by the first height (H1) in the first direction (e.g., the +z direction). In other words, according to an embodiment, the second region 322 constituting the boundary of the power transmission region 601 together with the third region 323 may be spaced apart from the power line 611 and/or the signal line 612 by the first height (H1).

According to an embodiment, in case that the second region 322 is spaced apart by the first height (H1), at least one dielectric 330 may be further included in the power transmission region 601 surrounded by the base dielectric material 339, the third region 323, and the second region 322. For example, at least one dielectric 330 may be further included in the power transmission region 601, in addition to the power line 611 and/or the signal line 612.

According to an embodiment, the at least one dielectric 330 may be made of substantially the same material as the dielectric 330 in FIG. 3, but is not limited thereto. For example, the at least one dielectric 330 included in the power transmission region 601 may be air or a first dielectric having a first dielectric constant. As another example, the at least one dielectric 330 included in the power transmission region 601 may be a second dielectric having a second dielectric constant and a third dielectric having a third dielectric constant.

Figure 7:
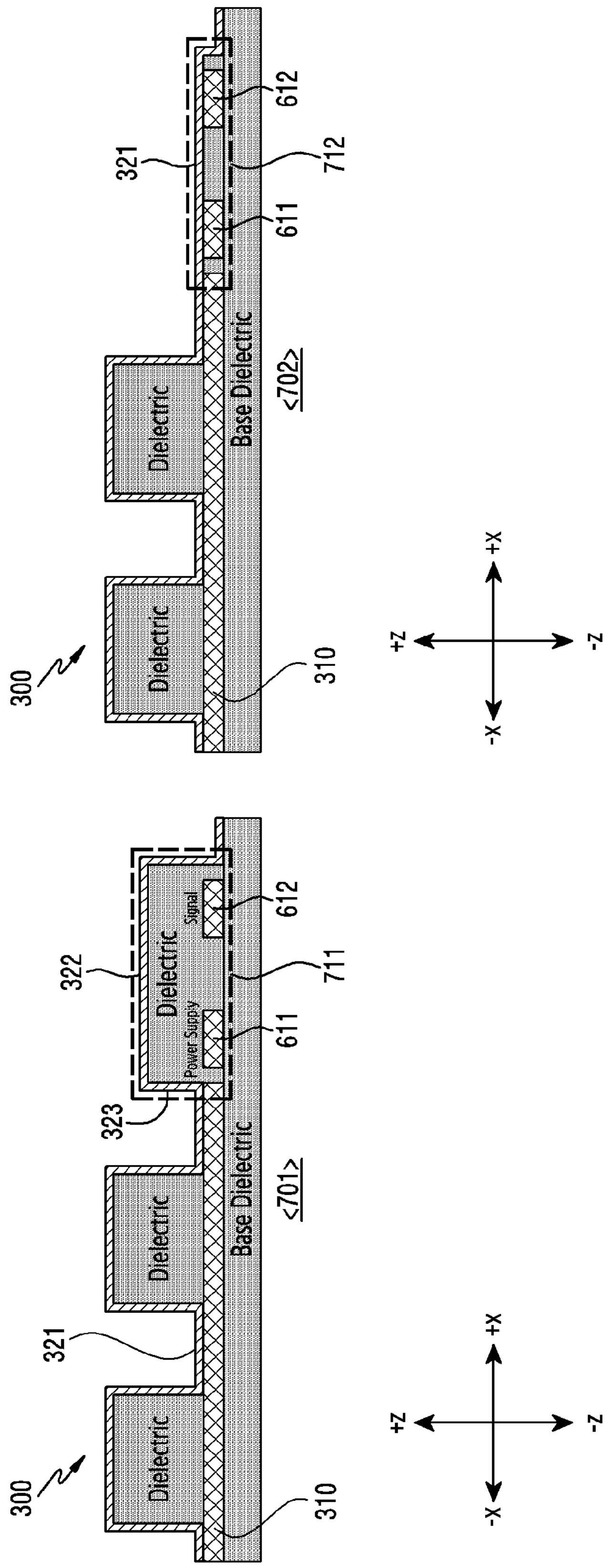
FIG. 7 illustrates an RF cable of an electronic device according to an embodiment of the disclosure.

FIG. 7 illustrates an RF cable of an electronic device according to an embodiment of the disclosure.

Referring to FIG. 7, a power transmission region 711 or 712 in FIG. 7 according to an embodiment may have a different height from a power transmission region 601 in FIG. 6.

Referring to example 701 in FIG. 7, the power transmission region 711 according to an embodiment may be formed to be lower than the first height (H1) of the first waveguide 341 and/or the second waveguide 342. For example, the third region 323 of the shielding film 320 constituting the power transmission region 711 may have a height lower than the first height (H1) of the first waveguide 341.

Referring to example 702 in FIG. 7, the power transmission region 712 according to an embodiment may be formed as the first region 321 of the shielding film 320. For example, the power transmission region 712 may extend in the third direction (e.g., the +x direction or the −x direction) from the first region 321.

According to an embodiment, a portion of the first region 321 of the shielding film 320 may be in contact with the power line 611 and/or the signal line 612.

In other words, one surface of the power line 611 and/or the signal line 612 may be in contact with the first region 321 of the shielding film 320, and the other surface of the power line 611 and/or the signal line 612 may be in contact with the base dielectric material 339.

Referring to the power transmission region 711 or 712 in FIG. 7 according to an embodiment, the size of the power transmission region 711 or 712 formed in the RF cable 300 is not limited.

Figure 8:
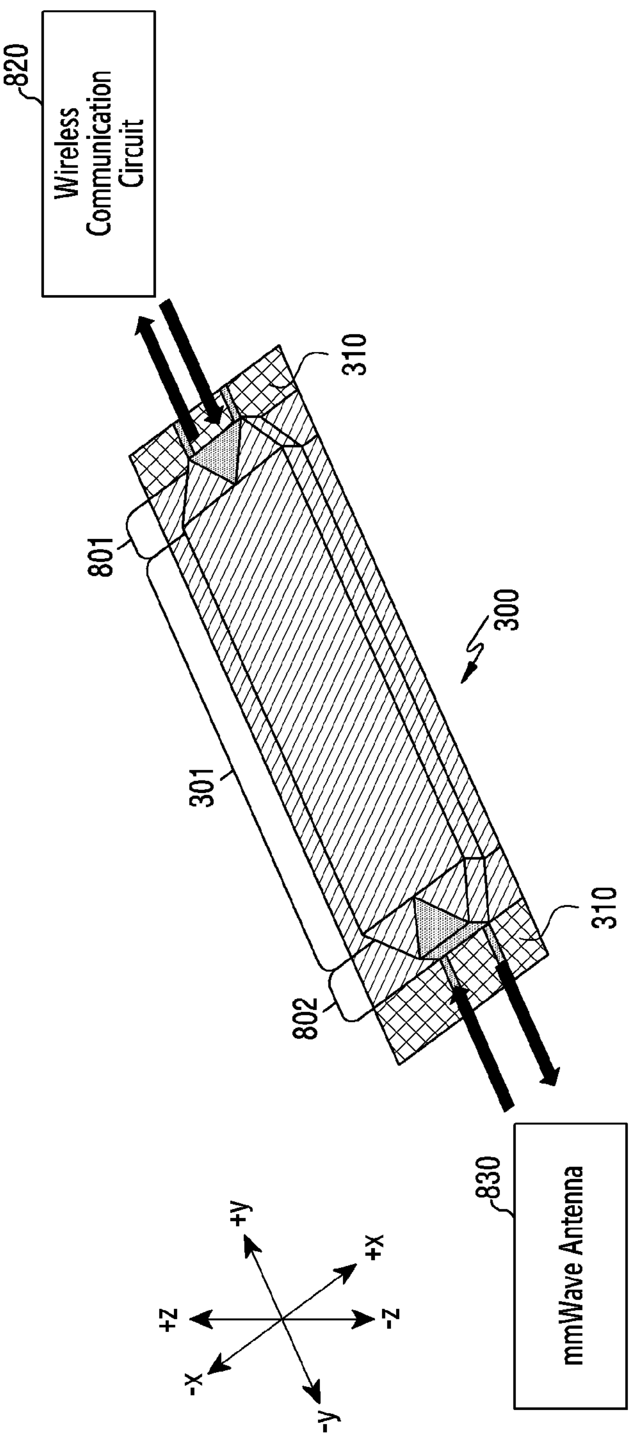
FIG. 8 illustrates an RF cable of an electronic device according to an embodiment of the disclosure.

FIG. 8 illustrates an RF cable of an electronic device according to an embodiment of the disclosure.

Referring to FIG. 8, an RF cable 300 may be electrically connected to a wireless communication circuit 820 and an mmWave antenna 830.

According to an embodiment, the RF cable 300 may include a first portion 301 in which the waveguide 340 is formed, a first connection portion 801 electrically connected to the wireless communication circuit 820, and a second connection portion 802 electrically connected to the mmWave antenna 830 including a plurality of conductive patches.

According to an embodiment, the first connection portion 801 and the second connection portion 802 may be formed at the ends of the first portion 301 of the RF cable 300. For example, the first connection portion 801 may be formed at one end of the first portion 301 of the RF cable 300, and the second connection portion 802 may be formed at the other end of the first portion 301 of the RF cable 300 opposite to the one end connected to the first connection portion 801.

According to an embodiment, the first portion 301 of the RF cable 300 may be electrically connected to the wireless communication circuit 820 or the mmWave antenna 830 through a connection portion and a signal line. For example, the first connection portion 801 may connect an RF signal transmitted through at least one waveguide 340 of the first portion 301 of the RF cable 300 to a signal line connected to the wireless communication circuit 820. For another example, the second connection portion 802 may connect an RF signal transmitted through the at least one waveguide 340 of the first portion 301 of the RF cable 300 to a signal line connected to the mmWave antenna 830.

According to an embodiment, in case that the RF cable 300 includes the first connection portion 801 and the second connection portion 802, the electronic device 100 may transmit and/or receive an RF signal through the at least one waveguide 340 of the RF cable 300. For example, the wireless communication circuit 820 connected to the RF cable 300 by the first connection portion 801 may transmit and/or transmit RF signals corresponding to the plurality of conductive patches through the at least one waveguide 340.

Figure 9:
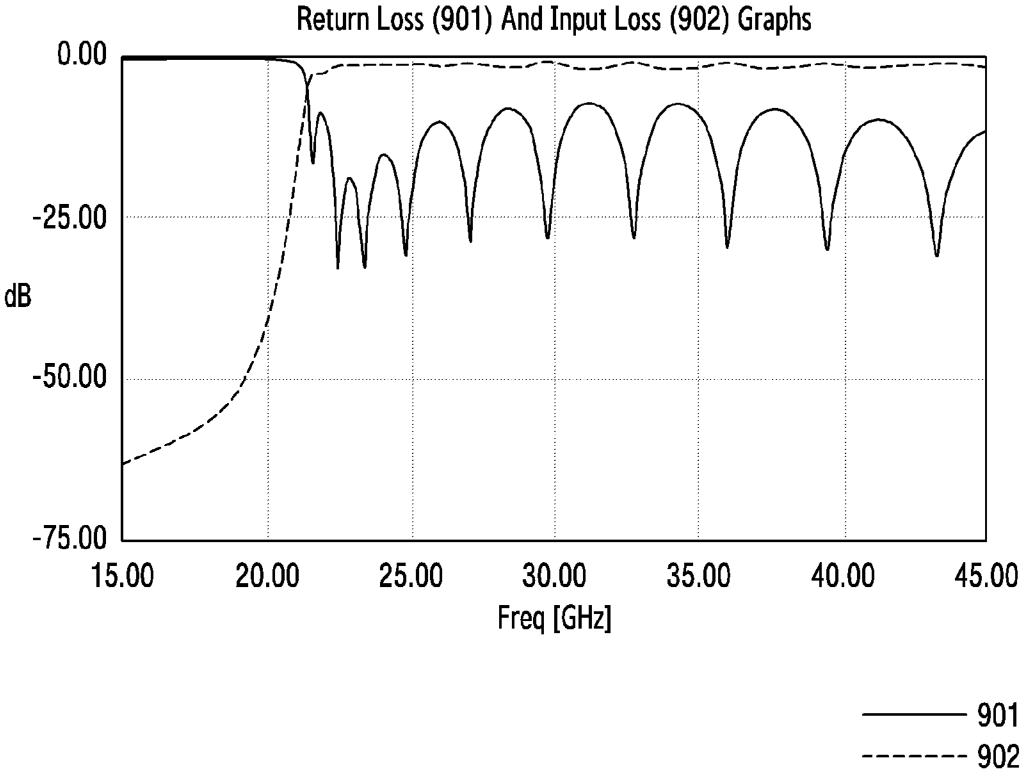
FIG. 9 is a graph showing comparison between a return loss and an input loss according to an embodiment of the disclosure.

FIG. 9 is a graph showing comparison between a return loss and an input loss, according to an embodiment of the disclosure.

According to an embodiment, FIG. 9 is a graph showing comparison between a return loss and an input loss caused when a wireless communication circuit transmits and/or receives an RF signal through the RF cable 300 including the waveguide 340 in FIG. 3.

According to an embodiment, a first graph 901 shows a return loss according to each frequency. According to an embodiment, a second graph 902 shows an input loss according to each frequency.

According to an embodiment, the x-axis of the first graph 901 and the second graph 902 may represent frequency (e.g., gigahertz (GHz)) and the y-axis of the first graph 901 and the second graph 902 may represent decibel (dB).

Referring to the first graph 901 and the second graph 902 according to an embodiment, radiation efficiency of an mmWave antenna configured to transmit and/or receive an RF signal through the RF cable 300 including the waveguide 340 in FIG. 3 may be improved in a frequency band within a range of 25 GHz to 45 GHz compared to a frequency band of 22 GHz or lower.

The RF cable 300 including the waveguide 340 in FIG. 3 according to an embodiment may be an RF cable 300 suitable for transmitting and/or receiving a signal in a frequency band within a range of 25 GHz to 45 GHz. In one example, the mmWave antenna including the plurality of conductive patches included in the electronic device 100 may include a fifth-generation (5G) antenna. For example, the wireless communication circuit (e.g., the wireless communication circuit 820 in FIG. 8) of the electronic device 100 may transmit and/or receive a signal in a frequency band within a range of 28 GHz to 39 GHz.

However, the frequency band in which the wireless communication circuit 820 of the electronic device 100 transmits and/or receives is not limited to a frequency band within a range of 28 GHz to 39 GHz. For example, the wireless communication circuit may transmit and/or receive a signal of a frequency band corresponding to sixth-generation (6G) of 39 GHz or higher.

Figure 10:
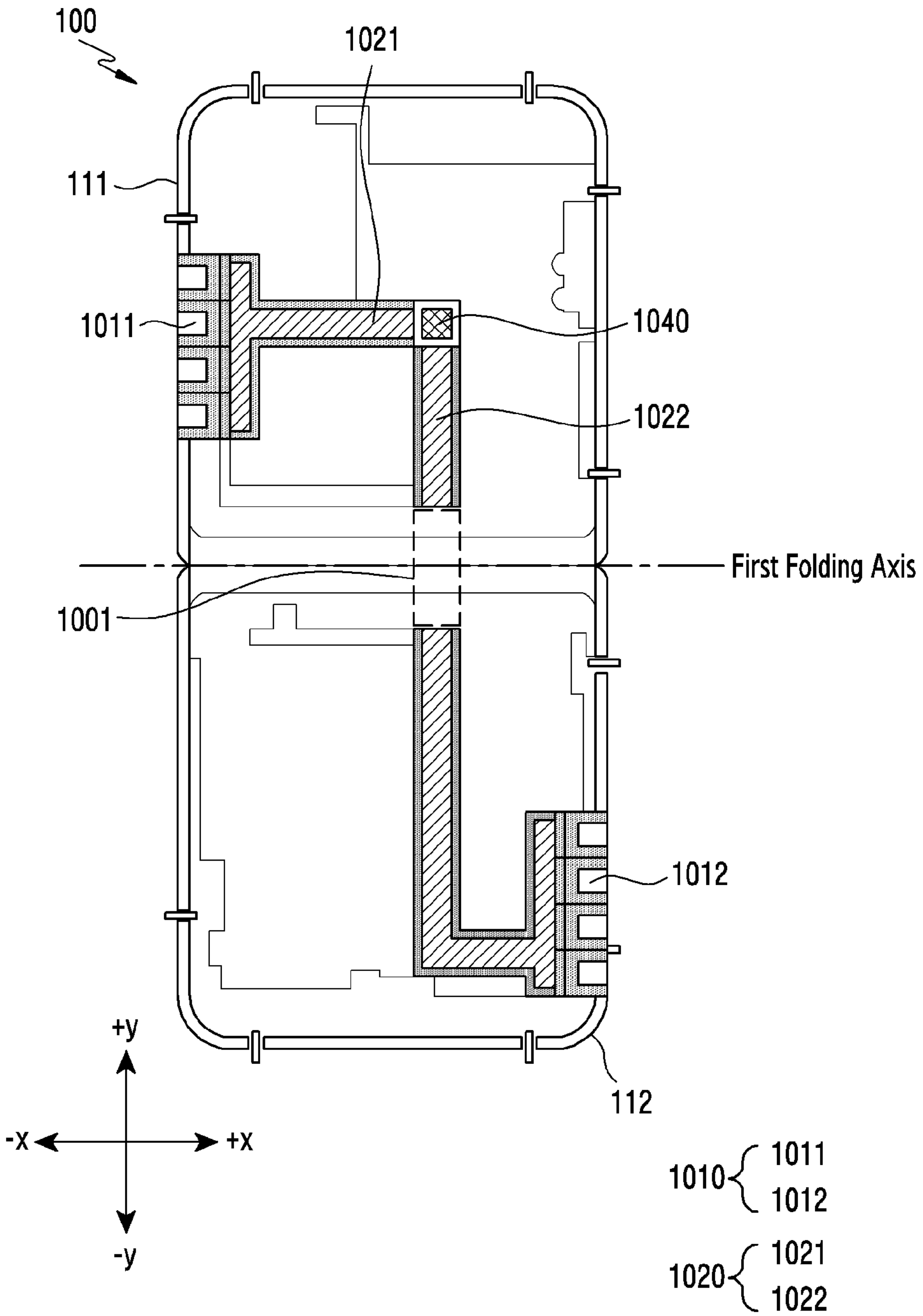
FIG. 10 illustrates the inside of an electronic device in an unfolded state according to an embodiment of the disclosure.

FIG. 10 illustrates the inside of an electronic device in an unfolded state according to an embodiment of the disclosure.

Referring to FIG. 10, an electronic device 100 according to an embodiment may include a first housing 111, a second housing 112 connected to the first housing 111, and a hinge structure (not shown) configured to connect the first housing 111 and the second housing 112 while being disposed between the first housing 111 and the second housing 112.

According to an embodiment, the second housing 112 may be rotatably connected to the first housing 111. For example, the second housing 112 may be connected to the first housing 111 to be rotatable about a folding axis by the hinge structure connecting the first housing 111 and the second housing 112.

According to an embodiment, the hinge structure may be formed between the first housing 111 and the second housing 112. For example, the hinge structure may be formed in a region corresponding to the first folding axis between the first housing 111 and the second housing 112.

According to an embodiment, the electronic device 100 may further include an mmWave antenna 1010, a wireless communication circuit 1040, and an RF cable 1020.

According to an embodiment, the mmWave antenna 1010 may refer to the mmWave antenna in FIG. 3. In one example, the mmWave antenna 1010 may include a plurality of conductive patches. For example, the mmWave antenna 1010 may include a 4×1 conductive patch antenna, as illustrated in FIG. 10.

The conductive patch antenna included in the mmWave antenna 1010 is described with the 4×1 conductive patch antenna as an example, but is not limited thereto. For example, the mmWave antenna 1010 may include a 5×1 conductive patch antenna. As another example, the mmWave antenna 1010 may include a 3×1 conductive patch antenna.

According to an embodiment, the mmWave antenna 1010 may include a plurality of conductive patches having various shapes. For example, the mmWave antenna 1010 may include a plurality of square-shaped conductive patch antennas. However, although the conductive patches shown in FIG. 10 are described as having a square shape, this is only an example, and in other embodiments, the conductive patches may have various shapes. For example, the conductive patches may have rectangular shape and/or circular shape.

According to an embodiment, the mmWave antenna 1010 of the electronic device 100 may include a first antenna 1011 and a second antenna 1012 which are adjacent to the housing 110. For example, the mmWave antenna 1010 may include the first antenna 1011 disposed adjacent to a side surface of the first housing 111, and the second antenna 1012 disposed adjacent to a side surface of the second housing 112.

The antenna included in the mmWave antenna 1010 has been described with the first antenna 1011 and the second antenna 1012 as examples, but is not limited thereto. For example, the mmWave antenna 1010 may further include a third antenna disposed in the first housing 111. As another example, the mmWave antenna 1010 may include only the first antenna 1011.

According to an embodiment, the wireless communication circuit 1040 (e.g., a radio-frequency integrated circuit (RFIC)) may refer to the wireless communication circuit in FIG. 3. For example, the wireless communication circuit 1040 may be disposed on a PCB disposed inside the electronic device 100. In addition, the wireless communication circuit 1040 may transmit and/or receive a signal in a designated frequency band by using the mmWave antenna 1010 by the RF cable 1020 to be described later.

According to an embodiment, the first antenna 1011 and the second antenna 1012 may be electrically connected to the wireless communication circuit 1040 by the RF cable 1020. In one example, the RF cable 1020 may be electrically connected to each of the 4×1 conductive patches included in the first antenna 1011 and the second antenna 1012. For example, the first antenna 1011 including the 4×1 conductive patches may be electrically connected to the wireless communication circuit 1040 disposed in the first housing 111 by a first RF cable 1021. In addition, for example, the second antenna 1012 including 4×1 conductive patches may be electrically connected within the second housing 112 by a second RF cable 1022 to the wireless communication circuit 1040 disposed in the first housing 111.

According to an embodiment, the number of the one or more waveguides 340 formed in the RF cable 1020 may be the same as the number of the plurality of conductive patches of the mmWave antenna 1010. For example, an mmWave first antenna 1011 including 4×1 conductive patches may be electrically connected to the first RF cable 1021 including four waveguides. For example, an mmWave second antenna 1012 forming 4×1 conductive patches may be electrically connected to the second RF cable 1022 forming four waveguides.

According to an embodiment, an RF cable 1020 in FIG. 10 may refer to the RF cable 300 in FIGS. 3 to 5. For example, a second RF cable 1022 may include a first portion of the second RF cable 1022 substantially identical to the first portion 301 of the RF cable 300 in FIGS. 3 to 7. For example, the first portion of the second RF cable 1022 may include at least one waveguide 340 formed by the shielding film 320 and the metal plate 310.

According to an embodiment, unlike the first RF cable 1021, the second RF cable 1022 may pass through the first folding axis of the electronic device 100 to be electrically connected to a wireless communication circuit 1040 disposed in the first housing 111. In one example, the second RF cable 1022 may pass through the hinge structure of the electronic device 100 to be electrically connected to the wireless communication circuit 1040.

According to an embodiment, the first portion of the second RF cable 1022 may be formed in a region penetrating the first folding axis of the electronic device 100. For example, the first portion of the second RF cable 1022 may be formed in a first folding region 1001 of the hinge structure corresponding to the first folding axis of the electronic device 100. As another example, the first portion of the second RF cable 1022 may correspond to a partial region of the second RF cable 1022 that is folded or unfolded when the electronic device 100 is folded or unfolded with reference to the first folding axis.

According to an embodiment, in case that the first portion of the second RF cable 1022 including the waveguide 340 in FIG. 3 is formed in the first folding region 1001 of the electronic device 100, the electronic device 100 may include an RF cable 1020 having greater durability in the process of being folded or unfolded than an RF cable including a waveguide including a via structure.

Figure 11:
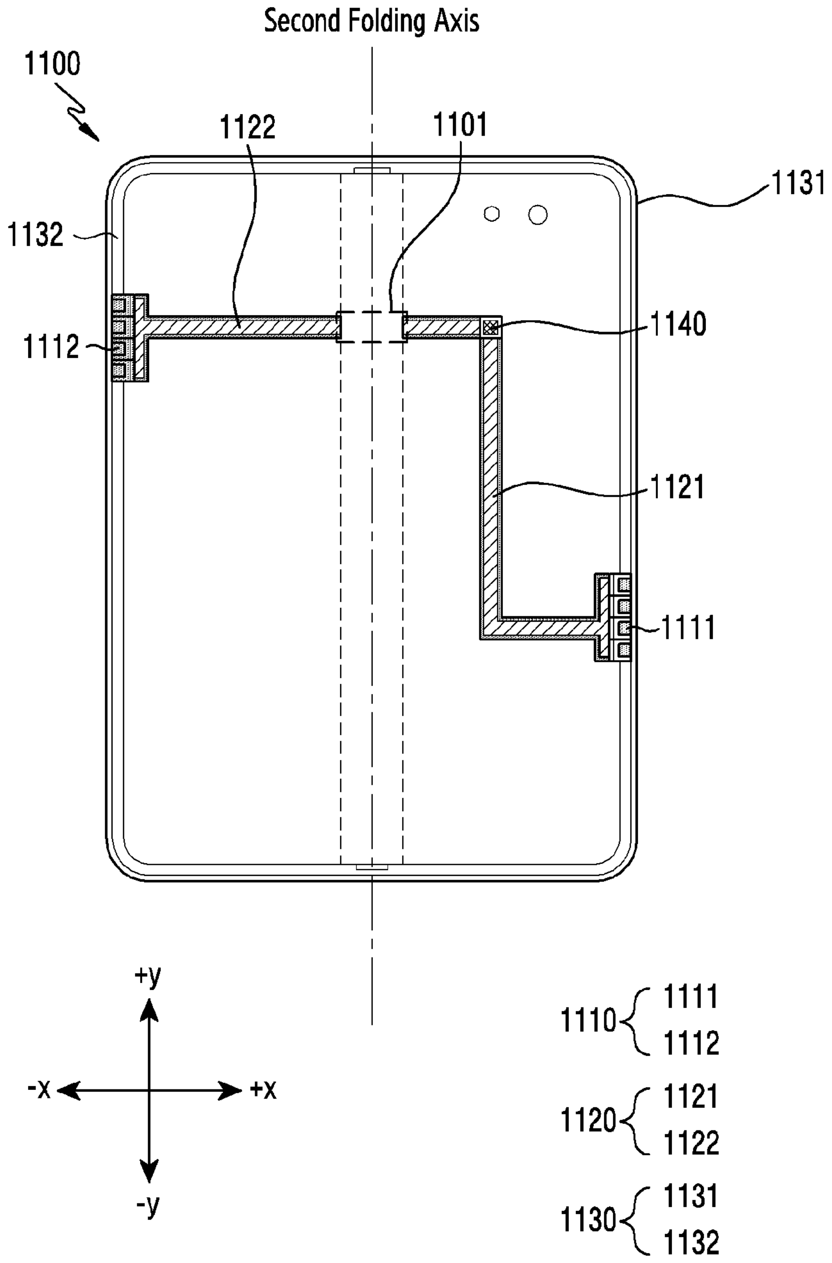
FIG. 11 illustrates the inside of an electronic device according to an embodiment of the disclosure.

FIG. 11 illustrates the inside of an electronic device according to an embodiment of the disclosure.

Referring to FIG. 11, an electronic device 1100 in FIG. 11 according to an embodiment may include an electronic device which is folded or unfolded with reference to the second folding axis, unlike an electronic device 1000 in FIG. 10. According to an embodiment, the second folding axis (e.g., the y-axis) may correspond to a folding axis perpendicular to the first folding axis (e.g., the x-axis) in FIG. 10.

According to an embodiment, the electronic device 1100 in FIG. 11 may refer to a portion of the electronic device 1000 in FIG. 10. For example, the electronic device 1100 in FIG. 11 may include an mmWave antenna 1110 disposed in a housing 1130 including a first housing 1131 and a second housing 1132, a wireless communication circuit 1140 disposed in the housing 1130, and an RF cable 1120 including a first RF cable 1121 and a second RF cable 1122 configured to electrically connect the wireless communication circuit 1140 and the mmWave antenna 1110. In addition, according to an embodiment, a first antenna 1111 and a second antenna 1112 of the mmWave antenna 1110 may include a plurality of conductive patches.

According to an embodiment, the RF cable 1120 in FIG. 11 may refer to the RF cable (e.g., the RF cable 300 in FIG. 3). In one example, a second RF cable 1122 may include a first portion 301 of the RF cable 300. For example, the first portion of the second RF cable 1122 may include at least one waveguide 340 formed by the shielding film 320 and the metal plate 310.

According to an embodiment, the first portion of the second RF cable 1122 may be formed in a region corresponding to a hinge structure of the electronic device 1100. In one example, the first portion of the second RF cable 1122 may be formed in a second folding region 1101 of the hinge structure corresponding to the second folding axis of the electronic device 1100. For example, the first portion of the second RF cable 1122 may correspond to a region of the second RF cable 1122 which is folded or unfolded when the electronic device 1100 is folded or unfolded based with reference to the second folding axis.

According to an embodiment, in case that the first portion of the second RF cable 1122 is formed in the second folding region 1101 of the electronic device 1100, the electronic device 1100 may include an RF cable 1020 having greater durability in the process of being folded or unfolded with reference to the second folding axis than an RF cable including a waveguide including a via structure.

Figure 12:
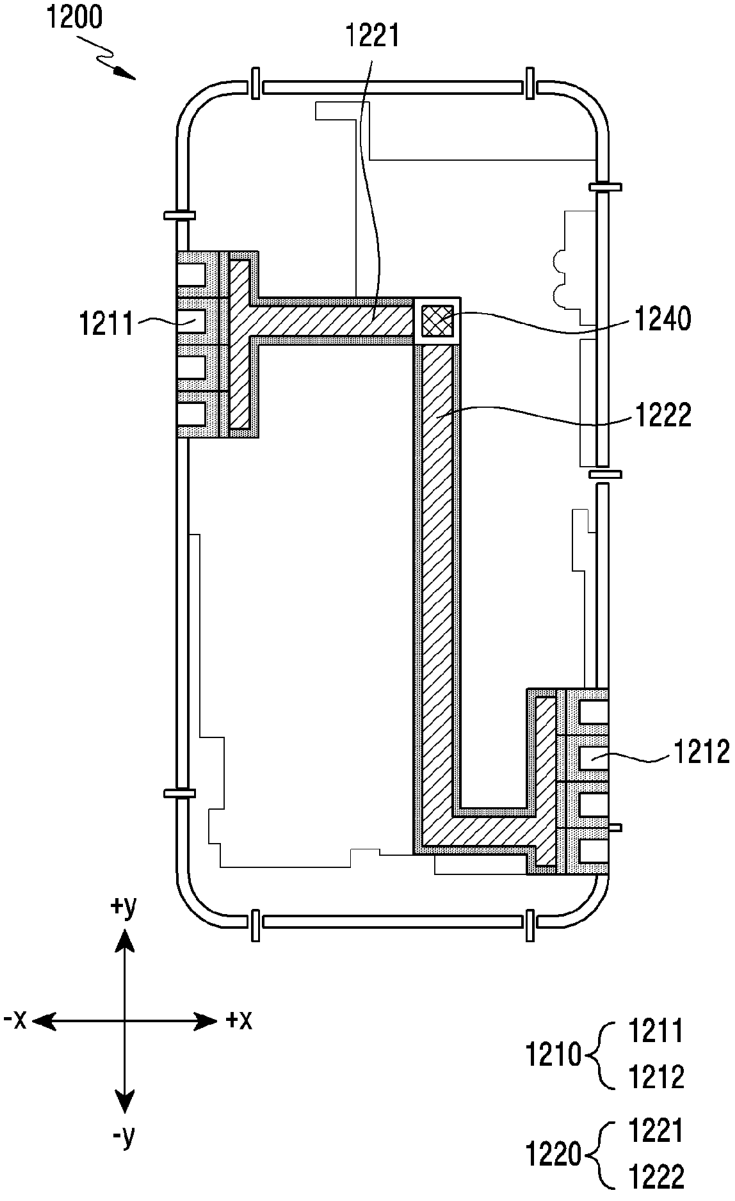
FIG. 12 illustrates the inside of an electronic device according to an embodiment of the disclosure.

FIG. 12 illustrates the inside of an electronic device according to an embodiment of the disclosure.

Referring to FIG. 12, an electronic device 1200 may include a bar-type electronic device unlike an electronic device 1000 in FIG. 10 and an electronic device 1100 in FIG. 11.

According to an embodiment, the electronic device 1200 in FIG. 12 may include an mmWave antenna 1210 including a first antenna 1211 and a second antenna 1212, a wireless communication circuit 1240, and an RF cable 1220 configured to electrically connect the mmWave antenna 1210 and the wireless communication circuit 1240.

According to an embodiment, the mmWave antenna 1210, the RF cable 1220, and the wireless communication circuit 1240 may refer to the mmWave antenna 1010, the RF cable 1020, and the wireless communication circuit 1040 in FIG. 10, respectively. For example, the first antenna 1211 of the mmWave antenna 1210 may include 4×1 conductive patches, and a first RF cable 1221 may include four waveguides formed in a number corresponding to the 4×1 conductive patches of the first antenna 1211.

According to an embodiment, the RF cable 1220 in FIG. 12 may refer to the RF cable 300 in FIG. 3. In one example, the first RF cable 1221 and a second RF cable 1222 may include the first portion 301 of the RF cable 300 in FIG. 3. For example, at least a portion of the first RF cable 1221 and the second RF cable 1222 may include a waveguide 340 formed by the shielding film 320 and the metal plate 310.

According to an embodiment, in case that the RF cable 1220 includes the waveguide 340 formed by the shielding film 320 and the metal plate 310, the electronic device 1200 may include the waveguide 340 more completely shielded than a waveguide having a via structure. According to an embodiment, in case that the waveguide 340 is completely shielded, the cumulative loss of the RF signal passing through the waveguide 340 may be reduced.

Figure 13:
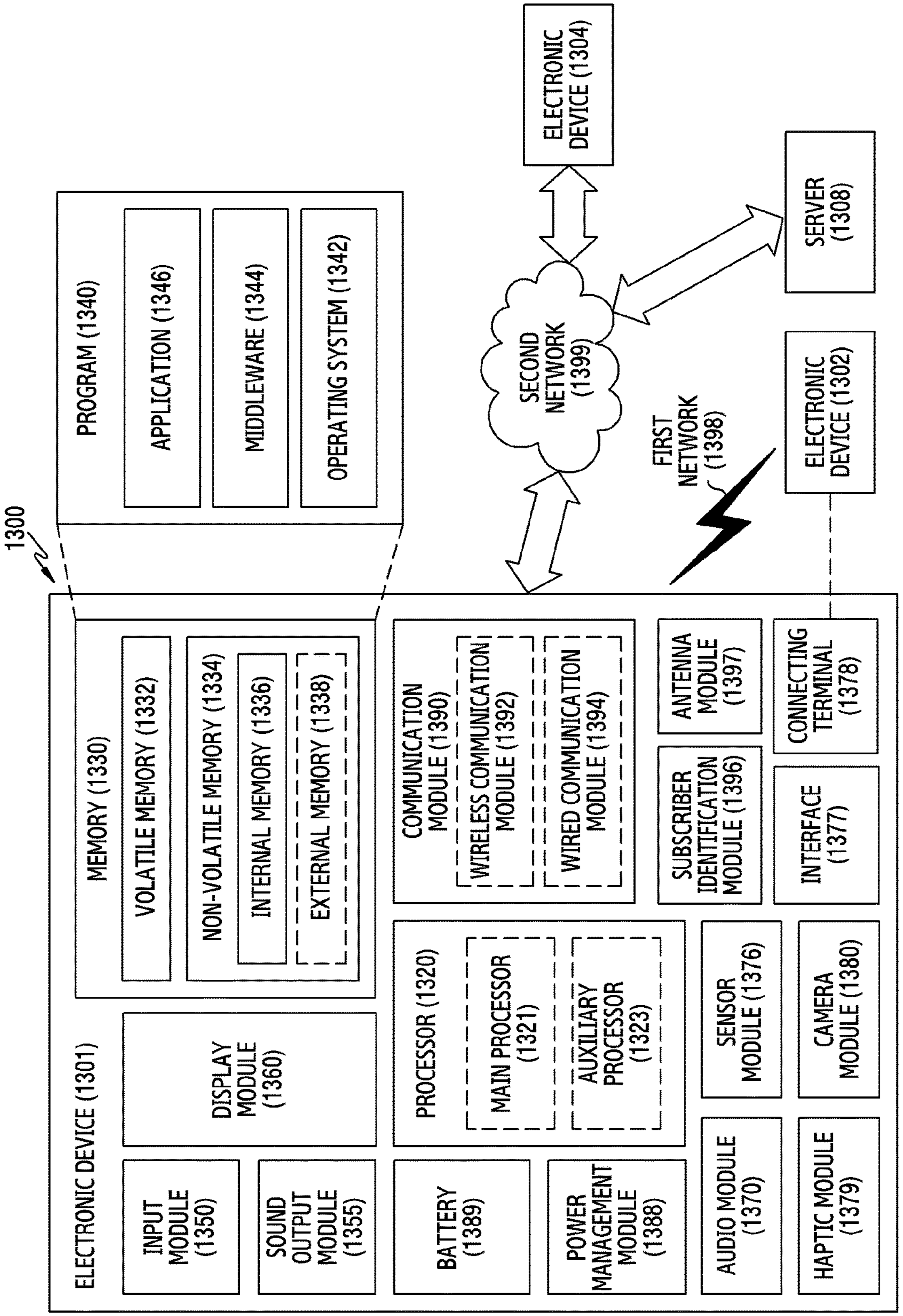
FIG. 13 illustrates an electronic device in a network environment according to an embodiment of the disclosure.

FIG. 13 is a block diagram illustrating an electronic device in a network environment according to an embodiment of the disclosure.

Referring to FIG. 13, an electronic device 1301 in a network environment 1300 may communicate with an external electronic device 1302 via a first network 1398 (e.g., a short-range wireless communication network), or at least one of an external electronic device 1304 or a server 1308 via a second network 1399 (e.g., a long-range wireless communication network). According to an embodiment, the electronic device 1301 may communicate with the external electronic device 1304 via the server 1308. According to an embodiment, the electronic device 1301 may include a processor 1320, memory 1330, an input module 1350, a sound output module 1355, a display module 1360, an audio module 1370, a sensor module 1376, an interface 1377, a connecting terminal 1378, a haptic module 1379, a camera module 1380, a power management module 1388, a battery 1389, a communication module 1390, a subscriber identification module (SIM) 1396, or an antenna module 1397. In some embodiments, at least one of the components (e.g., the connecting terminal 1378) may be omitted from the electronic device 1301, or one or more other components may be added in the electronic device 1301. In some embodiments, some of the components (e.g., the sensor module 1376, the camera module 1380, or the antenna module 1397) may be implemented as a single component (e.g., the display module 1360).

The processor 1320 may execute, for example, software (e.g., a program 1340) to control at least one other component (e.g., a hardware or software component) of the electronic device 1301 coupled with the processor 1320, and may perform various data processing or computation. According to one embodiment, as at least part of the data processing or computation, the processor 1320 may store a command or data received from another component (e.g., the sensor module 1376 or the communication module 1390) in volatile memory 1332, process the command or the data stored in the volatile memory 1332, and store resulting data in non-volatile memory 1334. According to an embodiment, the processor 1320 may include a main processor 1321 (e.g., a central processing unit (CPU) or an application processor (AP)), or an auxiliary processor 1323 (e.g., a graphics processing unit (GPU), a neural processing unit (NPU), an image signal processor (ISP), a sensor hub processor, or a communication processor (CP)) that is operable independently from, or in conjunction with, the main processor 1321. For example, when the electronic device 1301 includes the main processor 1321 and the auxiliary processor 1323, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one component (e.g., the display module 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to an embodiment, the auxiliary processor 1323 (e.g., an image signal processor or a communication processor) may be implemented as part of another component (e.g., the camera module 1380 or the communication module 1390) functionally related to the auxiliary processor 1323. According to an embodiment, the auxiliary processor 1323 (e.g., the neural processing unit) may include a hardware structure specified for artificial intelligence model processing. An artificial intelligence model may be generated by machine learning. Such learning may be performed, e.g., by the electronic device 1301 where the artificial intelligence is performed or via a separate server (e.g., the server 1308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input module 1350 may receive a command or data to be used by another component (e.g., the processor 1320) of the electronic device 1301, from the outside (e.g., a user) of the electronic device 1301. The input module 1350 may include, for example, a microphone, a mouse, a keyboard, a key (e.g., a button), or a digital pen (e.g., a stylus pen).

The sound output module 1355 may output sound signals to the outside of the electronic device 1301. The sound output module 1355 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1360 may visually provide information to the outside (e.g., a user) of the electronic device 1301. The display module 1360 may include, for example, a display, a hologram device, or a projector and control circuitry to control a corresponding one of the display, hologram device, and projector. According to an embodiment, the display module 1360 may include a touch sensor adapted to detect a touch, or a pressure sensor adapted to measure the intensity of force incurred by the touch.

The audio module 1370 may convert a sound into an electrical signal and vice versa. According to an embodiment, the audio module 1370 may obtain the sound via the input module 1350, or output the sound via the sound output module 1355 or a headphone of an external electronic device (e.g., the external electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the external electronic device 1302) directly (e.g., wiredly) or wirelessly. According to an embodiment, the interface 1377 may include, for example, a high definition multimedia interface (HDMI), a universal serial bus (USB) interface, a secure digital (SD) card interface, or an audio interface.

The connecting terminal 1378 may include a connector via which the electronic device 1301 may be physically connected with the external electronic device (e.g., the external electronic device 1302). According to an embodiment, the connecting terminal 1378 may include, for example, a HDMI connector, a USB connector, a SD card connector, or an audio connector (e.g., a headphone connector).

The haptic module 1379 may convert an electrical signal into a mechanical stimulus (e.g., a vibration or a movement) or electrical stimulus which may be recognized by a user via his tactile sensation or kinesthetic sensation. According to an embodiment, the haptic module 1379 may include, for example, a motor, a piezoelectric element, or an electric stimulator.

The camera module 1380 may capture a still image or moving images. According to an embodiment, the camera module 1380 may include one or more lenses, image sensors, image signal processors, or flashes.

The power management module 1388 may manage power supplied to the electronic device 1301. According to one embodiment, the power management module 1388 may be implemented as at least part of, for example, a power management integrated circuit (PMIC).

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the external electronic device 1302, the external electronic device 1304, or the server 1308) and performing communication via the established communication channel. The communication module 1390 may include one or more communication processors that are operable independently from the processor 1320 (e.g., the application processor (AP)) and supports a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or infrared data association (IrDA)) or the second network 1399 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The wireless communication module 1392 may support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1392 may support a high-frequency band (e.g., the mmWave band) to achieve, e.g., a high data transmission rate. The wireless communication module 1392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1392 may support various requirements specified in the electronic device 1301, an external electronic device (e.g., the external electronic device 1304), or a network system (e.g., the second network 1399). According to an embodiment, the wireless communication module 1392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1397 may transmit or receive a signal or power to or from the outside (e.g., the external electronic device) of the electronic device 1301. According to an embodiment, the antenna module 1397 may include an antenna including a radiating element composed of a conductive material or a conductive pattern formed in or on a substrate (e.g., a printed circuit board (PCB)). According to an embodiment, the antenna module 1397 may include a plurality of antennas (e.g., array antennas). In such a case, at least one antenna appropriate for a communication scheme used in the communication network, such as the first network 1398 or the second network 1399, may be selected, for example, by the communication module 1390 (e.g., the wireless communication module 1392) from the plurality of antennas. The signal or the power may then be transmitted or received between the communication module 1390 and the external electronic device via the selected at least one antenna. According to an embodiment, another component (e.g., a radio frequency integrated circuit (RFIC)) other than the radiating element may be additionally formed as part of the antenna module 1397.

According to various embodiments, the antenna module 1397 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device 1304 via the server 1308 coupled with the second network 1399. Each of the external electronic devices 1302 or 1304 may be a device of a same type as, or a different type, from the electronic device 1301.

According to an embodiment, all or some of operations to be executed at the electronic device 1301 may be executed at one or more of the external electronic devices 1302 and 1304 or the server 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, mobile edge computing (MEC), or client-server computing technology may be used, for example. The electronic device 1301 may provide ultra low-latency services using, e.g., distributed computing or mobile edge computing. In another embodiment, the external electronic device 1304 may include an internet-of-things (IoT) device. The server 1308 may be an intelligent server using machine learning and/or a neural network. According to an embodiment, the external electronic device 1304 or the server 1308 may be included in the second network 1399. The electronic device 1301 may be applied to intelligent services (e.g., smart home, smart city, smart car, or healthcare) based on 5G communication technology or IoT-related technology.

An electronic device according to various embodiments of the disclosure may include an mmWave antenna including a plurality of conductive patches, a wireless communication circuit disposed inside the electronic device, and a radio frequency (RF) cable configured to electrically connect the mmWave antenna and the wireless communication circuit, wherein a first portion of the RF cable may include a base dielectric, a metal plate disposed on one surface of the base dielectric, and a shielding film including a first region in contact with the metal plate, a second region spaced apart from the metal plate by a first height, and a third region configured to connect the first region and the second region, at least one waveguide may be formed by the second region, the third region, and a portion of the metal plate, and the wireless communication circuit may transmit and/or receive RF signals corresponding to the plurality of conductive patches through the at least one waveguide.

According to an embodiment, the first portion of the RF cable may further include at least one dielectric included in the at least one waveguide formed by the metal plate and the shielding film.

According to an embodiment, the at least one dielectric included in the at least one waveguide may be air.

According to an embodiment, the at least one dielectric included in the at least one waveguide may include a first dielectric having a first dielectric constant and a second dielectric having a second dielectric constant.

According to an embodiment, the number of the at least one waveguide may be identical to the number of the plurality of conductive patches.

According to an embodiment, the RF cable may further include at least one power transmission line, and the at least one power transmission line may be formed on an identical layer to the metal plate.

According to one embodiment, the metal plate may be a first metal plate disposed on the one surface of the base dielectric, and may further include a second metal plate disposed on the other surface opposite to the one surface of the base dielectric, wherein the shielding film may further include a fourth region in contact with the second metal plate, a fifth region spaced apart from the second metal plate by the first height, and a sixth region configured to connect the fourth region and the fifth region, and at least one waveguide may be further formed by the fifth region, the sixth region, and a portion of the second metal plate.

According to an embodiment, the RF cable may include a first portion in which the at least one waveguide is formed, a first connection portion connected to the wireless communication circuit, and a second connection portion connected to the plurality of conductive patches.

According to an embodiment, the first connection portion may connect an RF signal transmitted through the at least one waveguide to a signal line connected to the wireless communication circuit.

According to an embodiment, the second connection portion may connect an RF signal transmitted through the at least one waveguide to a signal line connected to the plurality of conductive patches.

An electronic device according to various embodiments of the disclosure may include a first housing, a second housing connected to be rotatable relative to the first housing, a hinge structure configured to connect the second housing to the first housing such that the second housing is rotatable about a folding axis with respect to the first housing, an mmWave antenna including a plurality of conductive patches, a wireless communication circuit disposed inside the electronic device, and a radio frequency (RF) cable configured to electrically connect the mmWave antenna and the wireless communication circuit, wherein a first portion of the RF cable formed in a region of the hinge structure corresponding to the folding axis may include a base dielectric, a metal plate disposed on one surface of the base dielectric, and a shielding film including a first region in contact with the metal plate, a second region spaced apart from the metal plate by a first height, and a third region configured to connect the first region and the second region, at least one waveguide is formed by the second region, the third region, and a portion of the metal plate, and the wireless communication circuit may transmit and/or receive RF signals corresponding to the plurality of conductive patches through the RF cable in which the at least one waveguide is formed.

According to an embodiment, the first portion of the RF cable may further include at least one dielectric included in the at least one waveguide formed by the metal plate and the shielding film.

According to an embodiment, the number of the at least one waveguide may be identical to the number of the plurality of conductive patches.

According to an embodiment, the RF cable may further include at least one power transmission line, and the at least one power transmission line may be formed on an identical layer to the metal plate.

According to an embodiment, the metal plate may be a first metal plate disposed on the one surface of the base dielectric, and may further include a second metal plate disposed on the other surface opposite to the one surface of the base dielectric, wherein the shielding film may further include a fourth region in contact with the second metal plate, a fifth region spaced apart from the second metal plate by the first height, and a sixth region configured to connect the fourth region and the fifth region, and at least one waveguide may be further formed by the fifth region, the sixth region, and a portion of the second metal plate.

An electronic device according to various embodiments of the disclosure may include an mmWave antenna including a plurality of conductive patches, a wireless communication circuit disposed inside the electronic device, and a radio frequency (RF) cable configured to electrically connect the mmWave antenna and the wireless communication circuit, wherein a first portion of the RF cable may include a metal plate disposed inside the RF cable, and a shielding film including a first region in contact with the metal plate, a second region spaced apart from the metal plate by a first height, and a third region configured to connect the first region and the second region, at least one waveguide may be formed by the second region, the third region, and a portion of the metal plate, and the wireless communication circuit may transmit and/or receive RF signals corresponding to the plurality of conductive patches through the at least one waveguide.

According to an embodiment, the first portion of the RF cable may further include at least one dielectric included in the at least one waveguide formed by the metal plate and the shielding film.

According to an embodiment, the at least one dielectric included in the at least one waveguide may include a first dielectric having a first dielectric constant and a second dielectric having a second dielectric constant.

According to an embodiment, the RF cable may further include at least one power transmission line, and the at least one power transmission line may be formed on an identical layer to the metal plate.

According to an embodiment, the number of the at least one waveguide may be identical to the number of the plurality of conductive patches.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1340) including one or more instructions that are stored in a storage medium (e.g., internal memory 1336 or external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a millimeter wave (mmWave) antenna comprising a plurality of conductive patches;

a wireless communication circuit disposed inside the electronic device; and a radio frequency (RF) cable electrically connecting the mmWave antenna to the wireless communication circuit, wherein a first portion of the RF cable comprises:

a base dielectric, a metal plate disposed on the base dielectric, and a shielding film comprising a first region in contact with the metal plate, a second region spaced apart from the metal plate, and a third region disposed between the first region and the second region, wherein at least one waveguide is formed by the second region, the third region, and a portion of the metal plate, and wherein the wireless communication circuit is configured to transmit or receive RF signals corresponding to the plurality of conductive patches through the at least one waveguide.

2. The electronic device of claim 1, wherein the first portion of the RF cable further comprises at least one dielectric included in the at least one waveguide formed by the metal plate and the shielding film.

3. The electronic device of claim 2, wherein the at least one dielectric included in the at least one waveguide comprises air.

4. The electronic device of claim 2, wherein the at least one dielectric included in the at least one waveguide comprises a first dielectric having a first dielectric constant and a second dielectric having a second dielectric constant.

5. The electronic device of claim 1, wherein a number of the at least one waveguide is identical to a number of the plurality of conductive patches.

6. The electronic device of claim 1, wherein the RF cable further comprises at least one power transmission line, and wherein the at least one power transmission line is formed on a layer identical to the metal plate.

7. The electronic device of claim 1, wherein the metal plate comprises a first metal plate disposed on one side of the base dielectric and a second metal plate disposed on another side of the base dielectric opposite to the one side of the base dielectric, wherein the shielding film further comprises a fourth region in contact with the second metal plate, a fifth region spaced apart from the second metal plate, and a sixth region disposed between the fourth region and the fifth region, and wherein the at least one waveguide is further formed by the fifth region, the sixth region, and a portion of the second metal plate.

8. The electronic device of claim 1, wherein the at least one waveguide is formed in the first portion of the RF cable, and wherein the RF cable further comprises a first connection portion connected to the wireless communication circuit and a second connection portion connected to the plurality of conductive patches.

9. The electronic device of claim 8, wherein an RF signal transmitted through the at least one waveguide is provided, through the first connection portion, to a signal line connected to the wireless communication circuit.

10. The electronic device of claim 8, wherein an RF signal transmitted through the at least one waveguide is provided, through the second connection portion, to a signal line connected to the plurality of conductive patches.

11. An electronic device comprising:

a first housing;

a second housing connected to the first housing and being rotatable relative to the first housing;

a hinge structure connecting the second housing to the first housing, the second housing being rotatable about a folding axis with respect to the first housing;

a millimeter wave (mmWave) antenna comprising a plurality of conductive patches;

a wireless communication circuit disposed inside the electronic device; and a radio frequency (RF) cable electrically connecting the mmWave antenna to the wireless communication circuit, wherein a first portion of the RF cable, which is formed in a region of the hinge structure corresponding to the folding axis, comprises:

a base dielectric, a metal plate disposed on the base dielectric, and a shielding film comprising a first region in contact with the metal plate, a second region spaced apart from the metal plate, and a third region disposed between the first region and the second region, wherein at least one waveguide is formed by the second region, the third region, and a portion of the metal plate, and wherein the wireless communication circuit is configured to at least one of transmit or receive RF signals corresponding to the plurality of conductive patches through the RF cable in which the at least one waveguide is formed.

12. The electronic device of claim 11, wherein the first portion of the RF cable further comprises at least one dielectric included in the at least one waveguide formed by the metal plate and the shielding film.

13. The electronic device of claim 11, wherein a number of the at least one waveguide is identical to a number of the plurality of conductive patches.

14. The electronic device of claim 11, wherein the RF cable further comprises at least one power transmission line, and wherein the at least one power transmission line is formed on a layer identical to the metal plate.

15. The electronic device of claim 11, wherein the metal plate comprises a first metal plate disposed on one side of the base dielectric and a second metal plate disposed on another side of the base dielectric opposite to the one side of the base dielectric, wherein the shielding film further comprises a fourth region in contact with the second metal plate, a fifth region spaced apart from the second metal plate, and a sixth region disposed between the fourth region and the fifth region, and wherein the at least one waveguide is further formed by the fifth region, the sixth region, and a portion of the second metal plate.

16. An electronic device comprising:

a millimeter wave (mmWave) antenna comprising a plurality of conductive patches;

a wireless communication circuit disposed inside the electronic device; and a radio frequency (RF) cable electrically connecting the mmWave antenna to the wireless communication circuit, wherein a first portion of the RF cable comprises:

a metal plate disposed inside the RF cable, and a shielding film comprising a first region in contact with the metal plate, a second region spaced apart from the metal plate, and a third region disposed between the first region and the second region, wherein at least one waveguide is formed by the second region, the third region, and a portion of the metal plate, and wherein the wireless communication circuit is configured to at least one of transmit or receive RF signals corresponding to the plurality of conductive patches through the at least one waveguide.

17. The electronic device of claim 16, wherein the first portion of the RF cable further comprises at least one dielectric included in the at least one waveguide formed by the metal plate and the shielding film.

18. The electronic device of claim 17, wherein the at least one dielectric included in the at least one waveguide comprises a first dielectric having a first dielectric constant and a second dielectric having a second dielectric constant.

19. The electronic device of claim 16, wherein the RF cable further comprises at least one power transmission line, and wherein the at least one power transmission line is formed on a layer identical to the metal plate.

20. The electronic device of claim 19, wherein the at least one power transmission line is disposed in a power transmission region, and wherein the power transmission region is surrounded by a base dielectric material and the shielding film.

21. The electronic device of claim 16, wherein a number of the at least one waveguide is identical to a number of the plurality of conductive patches.

22. The electronic device of claim 16, wherein the RF cable comprises a first connection portion partially formed at a first end of the RF cable and a second connection portion partially formed at a second end of the RF cable, and wherein the first portion of the RF cable is formed in a region of the RF cable other than the first connection portion and the second connection portion.

23. The electronic device of claim 16, wherein the shielding film is formed of a flexible material, and wherein the RF cable is disposed in a folding region of the electronic device, the folding region of the electronic device being configured to be folded or unfolded.

24. A cable comprising:

a base dielectric layer;

a metal layer disposed on the base dielectric layer; and a shielding film comprising a first region in contact with the metal layer, a second region spaced apart from the metal layer, and a third region disposed between the first region and the second region, wherein at least one waveguide is formed by the second region, the third region, and a portion of the metal layer.

25. The cable of claim 24, further comprising:

at least one dielectric included in the at least one waveguide formed by the metal layer and the shielding film.

26. The cable of claim 25, wherein the at least one dielectric included in the at least one waveguide comprises air.

27. The cable of claim 25, wherein the at least one dielectric included in the at least one waveguide comprises a first dielectric having a first dielectric constant and a second dielectric having a second dielectric constant.

28. The cable of claim 24, further comprising:

at least one power transmission line, wherein the at least one power transmission line is formed on a layer identical to the metal layer.

29. The cable of claim 24, wherein the metal layer comprises a first metal layer disposed on one side of the base dielectric layer and a second metal layer disposed on another side of the base dielectric layer opposite to the one side of the base dielectric layer, wherein the shielding film further comprises a fourth region in contact with the second metal layer, a fifth region spaced apart from the second metal layer, and a sixth region disposed between the fourth region and the fifth region, and wherein the at least one waveguide is formed by the fifth region, the sixth region, and a portion of the second metal layer.

30. The cable of claim 24, wherein the at least one waveguide is formed in the cable, and wherein the cable further comprises a first connection portion connected to a wireless communication circuit and a second connection portion connected to a plurality of conductive patches for an antenna.

31. The cable of claim 30, wherein a radio frequency (RF) signal transmitted through the at least one waveguide is provided, through the first connection portion, to a signal line connected to the wireless communication circuit.

32. The cable of claim 30, wherein a radio frequency (RF) signal transmitted through the at least one waveguide is provided, through the second connection portion, to a signal line connected to the plurality of conductive patches.

33. An electronic device comprising:

a cable comprising:

a base dielectric layer, a metal layer disposed on the base dielectric layer, and a shielding film comprising a first region in contact with the metal layer, a second region spaced apart from the metal layer, and a third region disposed between the first region and the second region, wherein at least one waveguide is formed by the second region, the third region, and a portion of the metal layer;

a millimeter wave (mmWave) antenna comprising a plurality of conductive patches; and a wireless communication circuit disposed inside the electronic device, wherein the wireless communication circuit transmits radio frequency (RF) signals to the plurality of conductive patches through the at least one waveguide formed by the cable.

34. The electronic device of claim 33, wherein a number of the at least one waveguide is identical to a number of the plurality of conductive patches.

* * * * *